United States Patent
Shiiyama

(10) Patent No.: US 7,233,945 B2
(45) Date of Patent: Jun. 19, 2007

(54) DOCUMENT PROCESSING APPARATUS

(75) Inventor: Hirotaka Shiiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 466 days.

(21) Appl. No.: 10/854,267

(22) Filed: May 27, 2004

(65) Prior Publication Data

US 2004/0243602 A1    Dec. 2, 2004

(30) Foreign Application Priority Data

May 29, 2003    (JP)    ............... 2003-152833

(51) Int. Cl.
  *G06F 7/00*    (2006.01)
(52) U.S. Cl. .................... 707/4; 707/100
(58) Field of Classification Search .......... 707/3–10, 707/1, 100; 382/170, 173, 181
  See application file for complete search history.

(56) References Cited

U.S. PATENT DOCUMENTS 6,253,201 B1 *  6/2001  Abdel-Mottaleb et al. ..... 707/4
6,721,449 B1 *  4/2004  Krishnamachari .......... 382/165
2001/0004739 A1 *  6/2001  Sekiguchi et al. .......... 707/100
2003/0108223 A1 *  6/2003  Prokoski .................... 382/115
2003/0113017 A1 *  6/2003  Thomas et al. ............. 382/181
2006/0013481 A1 *  1/2006  Park et al. .................. 382/170

FOREIGN PATENT DOCUMENTS

| JP | 10-198695 | 7/1998 |
| JP | 2001-319231 | 11/2001 |
| JP | 2001-319231 A | 11/2001 |
| JP | 2002-519749 | 7/2002 |

* cited by examiner

Primary Examiner—Wilson Lee
(74) Attorney, Agent, or Firm—Fitzpatrick, Cella, Harper & Scinto

(57) ABSTRACT

This invention provides a document processing apparatus and method for searching, for a specific document image, a database in which a plurality of document images are registered in correspondence with the attributes of partial regions. A document image associated with search is segmented into partial regions. The attribute of each partial region of the segmented document image associated with search is determined. At least one document image is selected from document images registered in the database on the basis of the number of partial regions for each attribute in the document image associated with search.

18 Claims, 22 Drawing Sheets

FIG. 6

| 1 | 2 | 3 |
|---|---|---|
| 4 | 5 | 6 |
| 7 | 8 | 9 |

FIG. 7

| DOCUMENT IMAGE ID | FULL-PATH FILE NAME | IMAGE REGION COUNT | TEXT REGION COUNT | IMAGE REGION ID | TEXT REGION ID |
|---|---|---|---|---|---|
| 0000001 | C:\img\0000001.jpg | 1 | 1 | 0000001 | 0000001 |
| 0000002 | C:\img\0000002.jpg | 1 | 0 | 0000002 | |
| 0000003 | C:\img\0000003.jpg | 0 | 1 | | 0000002 |
| 0000004 | C:\img\0000004.jpg | 1 | 1 | 0000003 | 0000003 |
| 0000005 | C:\img\0000005.jpg | 2 | 2 | 0000004<br>0000005 | 0000004<br>0000005 |
| 0000006 | C:\img\0000006.jpg | 2 | 1 | 0000006<br>0000007 | 0000006 |

FIG. 8

| TEXT REGION ID | ASPECT RATIO | SIZE | BARYCENTRIC POSITION | INTRA-REGION TEXT INFORMATION | DOCUMENT IMAGE ID |
|---|---|---|---|---|---|
| 0000001 | 0.7 | 0.2 | 0.5, 0.2 | ...... | 0000001 |
| 0000002 | 1.5 | 0.6 | 0.5, 0.5 | ...... | 0000003 |
| 0000003 | 1.1 | 0.15 | 0.7, 0.2 | ...... | 0000004 |
| 0000004 | 1.3 | 0.2 | 0.5, 0.4 | ...... | 0000005 |
| 0000005 | 2.5 | 0.3 | 0.75, 0.7 | ...... | 0000005 |
| 0000006 | 0.5 | 0.2 | 0.8, 0.7 | ...... | 0000006 |

FIG. 9

| IMAGE REGION ID | ASPECT RATIO | SIZE | BARYCENTRIC POSITION | COLOR FEATURE INFORMATION | DOCUMENT IMAGE ID |
|---|---|---|---|---|---|
| 0000001 | 1.0 | 0.5 | 0.5, 0.7 | ...... | 0000001 |
| 0000002 | 1.5 | 0.6 | 0.5, 0.5 | ...... | 0000002 |
| 0000003 | 1.1 | 0.15 | 0.7, 0.5 | ...... | 0000004 |
| 0000004 | 0.5 | 0.1 | 0.5, 0.2 | ...... | 0000005 |
| 0000005 | 0.8 | 0.3 | 0.25, 0.7 | ...... | 0000005 |
| 0000006 | 0.2 | 0.4 | 0.4, 0.7 | ...... | 0000006 |
| 0000007 | 0.5 | 0.2 | 0.8, 0.7 | ...... | 0000006 |

FIG. 11

| TEXT REGION COUNT | DOCUMENT IMAGE ID COUNT | DOCUMENT IMAGE ID | TEXT REGION ID COUNT | TEXT REGION ID |
|---|---|---|---|---|
| 0 | 1 | 0000002 | 1 | |
| 1 | 4 | 0000001<br>0000003<br>0000004<br>0000006 | 4 | 0000001<br>0000002<br>0000003<br>0000006 |
| 2 | 0 | 0000005 | 2 | 0000004<br>0000005 |
| 3 | 0 | | 0 | |
| 4 | 0 | | 0 | |
| 5 | 0 | | 0 | |

FIG. 12

| IMAGE REGION COUNT | DOCUMENT IMAGE ID COUNT | DOCUMENT IMAGE ID | IMAGE REGION ID COUNT | IMAGE REGION ID |
|---|---|---|---|---|
| 0 | 1 | 0000003 | 1 | 0000001 |
| 1 | 3 | 0000001<br>0000002<br>0000004 | 4 | 0000001<br>0000002<br>0000003 |
| 2 | 2 | 0000005<br>0000006 | 4 | 0000004<br>0000005<br>0000006<br>0000007 |
| 3 | 0 | | 0 | |
| 4 | 0 | | 0 | |
| 5 | 0 | | 0 | |

DOCUMENT PROCESSING APPARATUS

FIELD OF THE INVENTION

The present invention relates to a technique of efficiently searching for a document at high precision.

BACKGROUND OF THE INVENTION

There have conventionally been proposed several techniques pertaining to pre-search of narrowing down search targets in advance under conditions with a light processing load before a search process under conditions with a heavy processing load.

For example, Japanese Patent Laid-Open No. 2001-319231 discloses a technique of saving a document within a database in advance together with the number of regions of the document, segmenting an input image into regions to calculate the number of regions, narrowing down search targets to ones having the same number of regions, and then comparing feature amounts. This technique can narrow down search targets by a very simple process.

To search a database which increases in size due to an increase in business documents and the like, narrowdown by the conventional technique is not sufficient, and a higher-precision narrowdown technique is required. The conventional technique does not pay any attention to a region detection error or excessive region detection in a region segmentation process, and search omission may occur.

SUMMARY OF THE INVENTION

The present invention solves the conventional drawbacks and other drawbacks. According to the present invention, the foregoing object is attained by providing a document processing apparatus having a database which stores a plurality of document images, comprising: first segmentation means for segmenting a document image associated with registration into partial regions; first attribute determination means for determining an attribute of each partial region of the segmented document image associated with registration; registration means for registering the document image associated with registration and the attribute of the partial region of the document image associated with registration in a database in correspondence with each other; second segmentation means for segmenting a document image associated with search into partial regions; second attribute determination means for determining an attribute of each partial region of the segmented document image associated with search; and selection means for selecting at least one document image from document images registered in the database on the basis of the number of partial regions for each attribute in the document image associated with search.

According to another aspect of the present invention, the foregoing object is attained by providing a document processing method of searching, for a specific document image, a database in which a plurality of document images are registered in correspondence with attributes of partial regions, comprising the steps of: segmenting a document image associated with search into partial regions; determining an attribute of each partial region of the segmented document image associated with search; and selecting at least one document image from document images registered in the database on the basis of the number of partial regions for each attribute in the document image associated with search.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 6 is a view showing an example of the feature amount scanning order of segmented blocks for image feature amount extraction in the embodiment of the present invention;

FIG. 7 is a table showing an example of the data schema of an image management DB in the embodiment of the present invention;

FIG. 8 is a table showing an example of the data schema of an image region management DB in the embodiment of the present invention;

FIG. 9 is a table showing an example of the data schema of a text region management DB in the embodiment of the present invention;

FIG. 11 is a table showing an example of indices for obtaining a document image ID and the like from the number of text regions in the embodiment of the present invention;

FIG. 12 is a table showing an example of indices for obtaining a document image ID and the like from the number of image regions in the embodiment of the present invention;

DETAILED DESCRIPTION OF THE PREFERRED EMBODIMENTS

Preferred embodiments of the present invention will now be described in detail in accordance with the accompanying drawings.

[Apparatus Arrangement]

Figure 1:
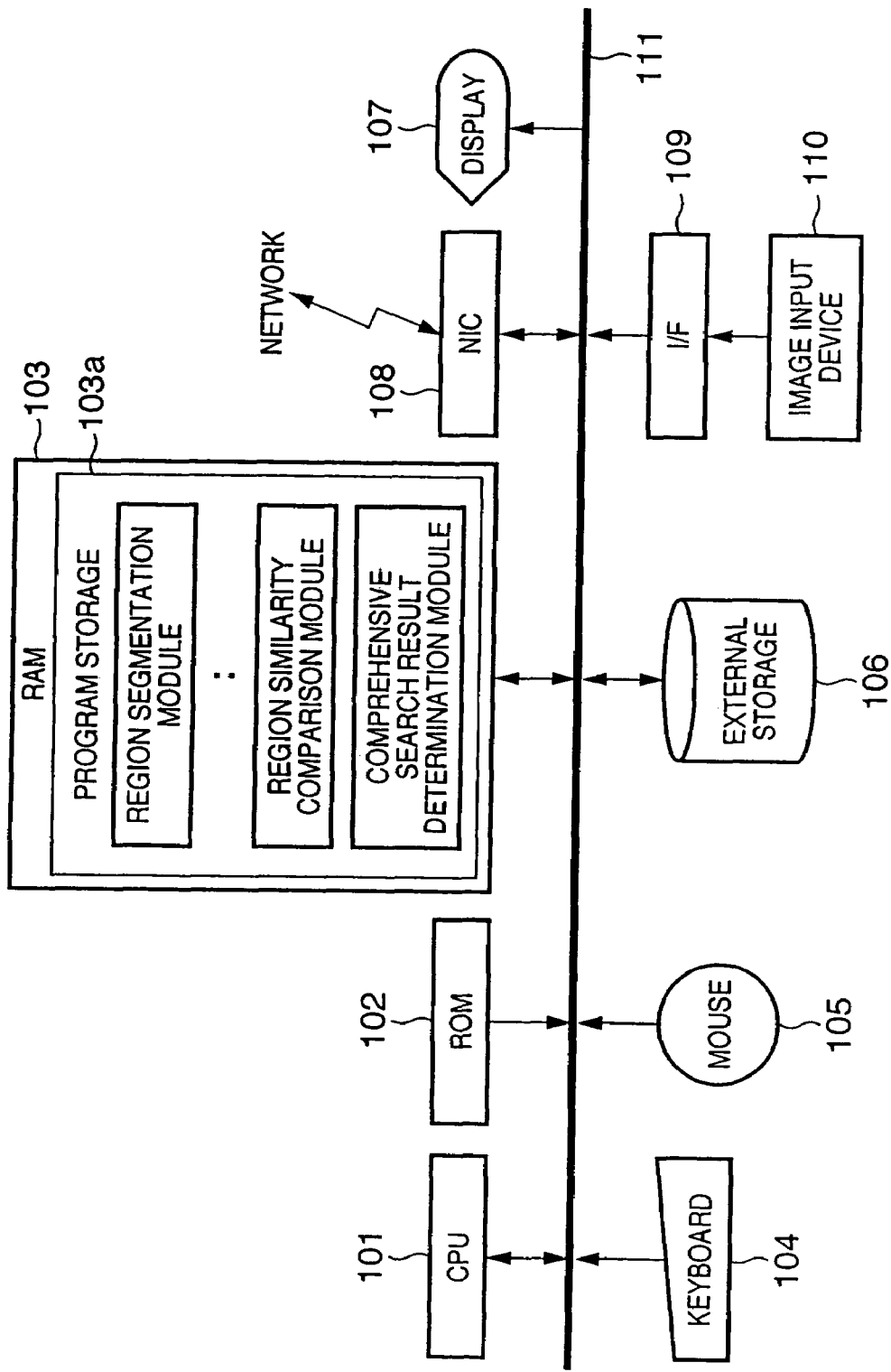
FIG. 1 is a block diagram showing the arrangement of a document processing apparatus in an embodiment of the present invention.

FIG. 1 is a block diagram showing an example of the arrangement of a document processing apparatus according to an embodiment.

In FIG. 1, reference numeral 101 denotes a CPU which executes various calculation and control operations in the document processing apparatus. Reference numeral 102 denotes a ROM which stores a boot program to be executed at the startup of the apparatus and various permanent data. Reference numeral 103 denotes a RAM which stores a control program to be processed by the CPU 101 and provides a work area used when the CPU 101 executes various control operations. For example, the RAM 103 is used as an image memory for temporarily storing an image in image input. In addition, the RAM 103 stores in a program storage 103a a region segmentation module, region comparison module, comprehensive search result determination module, and the like.

Reference numeral 104 denotes a keyboard; and 105, a mouse. The keyboard 104 and mouse 105 provide various input operation environments such as designation of a processing mode by the user. Reference numeral 106 denotes an external storage which is formed by a hard disk or the like and is used as an image storage area for storing an image management database (DB), image region management DB, text region management DB, and image data, all of which will be described later. Reference numeral 107 denotes a display such as a liquid crystal display or CRT; and 108, a network interface which enables communication with each device on a network. Reference numeral 109 denotes an interface; and 110, an image input device such as an image scanner or digital camera. Reference numeral 111 denotes a bus which connects the above-described units.

Figure 2:
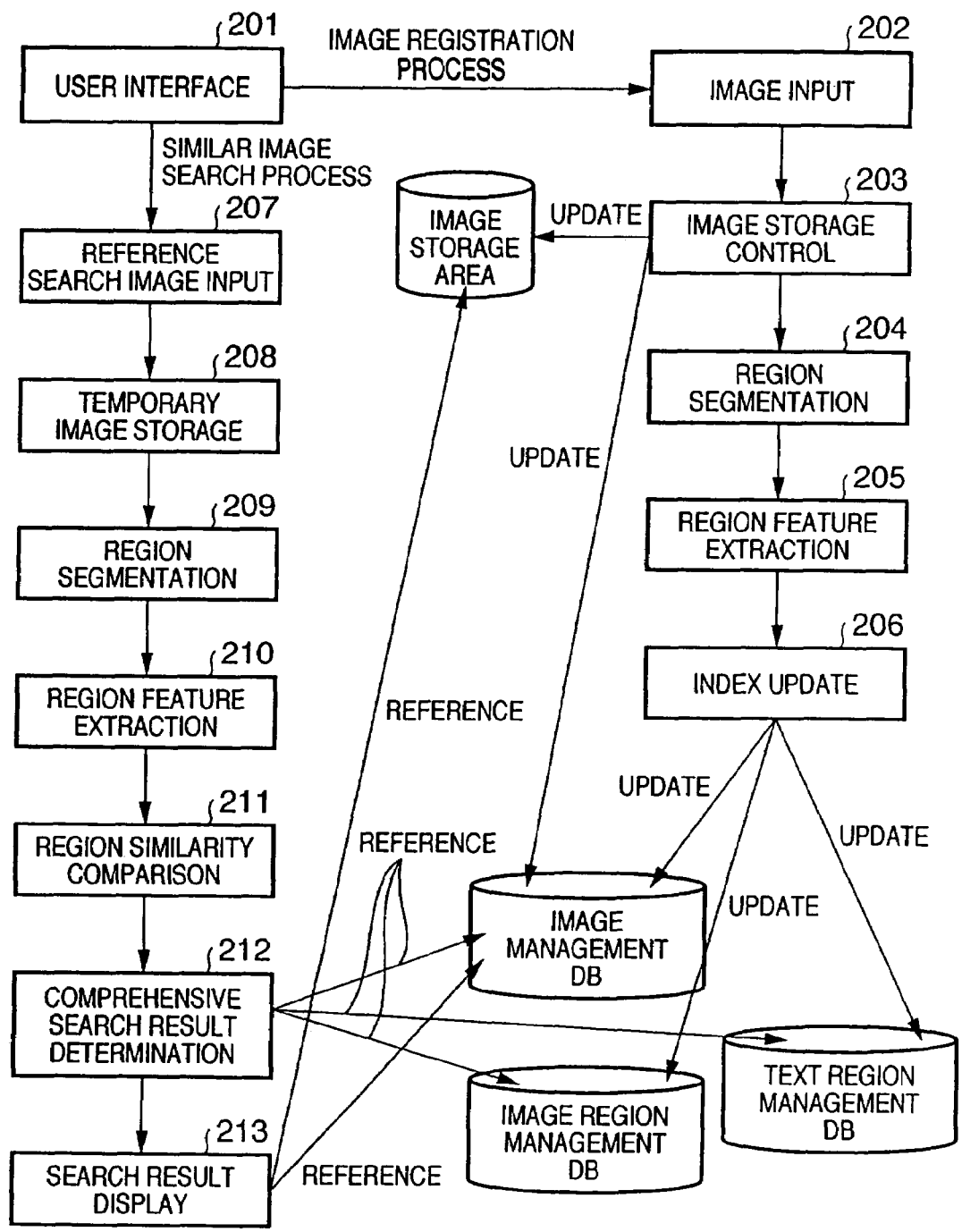
FIG. 2 is a block diagram showing the functional arrangement of a region similarity comparison process in the embodiment of the present invention.

FIG. 2 is a block diagram showing the functional arrangement of a region similarity comparison process in the document processing apparatus according to the embodiment.

In FIG. 2, reference numeral 201 denotes a user interface which detects various operation inputs from the user by using the display 107, keyboard 104, and mouse 105, and also performs a process branch to an image registration process or similar image search process.

Reference numerals 202 to 206 denote modules for implementing the image registration process. The image input module 202 receives a document as image data from the image input device 110. The image storage control module 203 temporarily stores image data obtained by the image input module in the image memory of the RAM 103, and also stores the image data in the image storage area of the external storage 106. The RAM 103 registers the storage address in the image management DB of the external storage 106.

The region segmentation module 204 segments an image in the image memory into a plurality of partial regions. The region feature extraction module 205 extracts the feature of each partial region. The index update module 206 registers pieces of feature information extracted from partial regions in the image management DB, image region management DB, and text region management DB of the external storage 106.

Reference numerals 207 to 213 denote modules for implementing the similar image search process. The reference search image input module 207 receives image data serving as a search reference from the image input device 110. The received image data is temporarily stored in the image memory of the RAM 103 by the temporary image storage module 208. In the embodiment, an image input as a search condition will be called a "reference search image." The region segmentation module 209 segments a reference search image in the image memory into a plurality of partial regions. The region feature extraction module 210 extracts the feature of each partial region. The region similarity comparison module 211 compares the feature of each partial region of a reference search image that is extracted by the region feature extraction module 210, with the features of partial regions registered in the image management DB, image region management DB, and text region management DB, obtaining a partial region result of a registered image that is similar to the partial region of the reference search image. The comprehensive search result determination module 212 finally decides the similar registered image by using the partial region result of the registered image. The search result display module 213 displays the search result on the display 107.

Processes in the embodiment will be explained in detail separately for the image registration process and similar image search process.

[Image Registration Process]

In registering an image, a document image is segmented into pluralities of image regions and text regions. The aspect ratio, the size with respect to the document image, and the barycentric position are obtained as outer shape feature amounts for each region. Also, a feature amount for the contents of the region is also obtained. These feature amounts are registered in the image management DB in FIG. 7, the image region management DB in FIG. 8, and the text region management DB in FIG. 9 in correspondence with the image.

Figure 3:
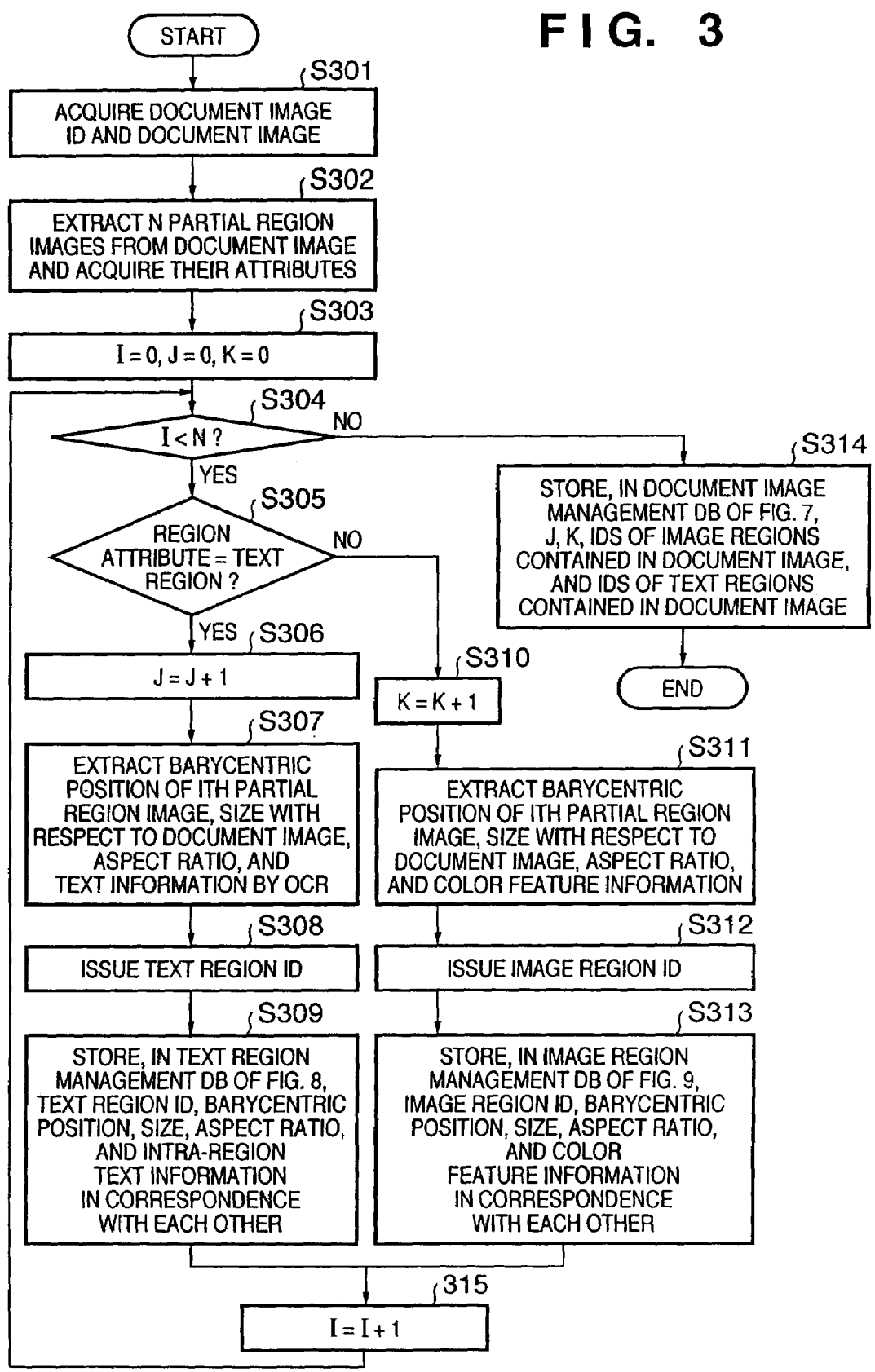
FIG. 3 is a flowchart showing a registration process in the embodiment of the present invention.

FIG. 3 shows the flow of an index generation process in the image registration process.

In step S301, a document image is obtained from the image input device 110 by the process of the image input module 202. The ID of the document image is issued by the process of the image storage control module 203. The ID is stored in a document image ID field shown in FIG. 7, and the storage address of the document image is stored in a full-path file name field. The document image is stored as a file in an image storage means. When electronic data in the external storage 106 is to be registered, the electronic data may also be converted into a raster image and stored in the image storage means. Conversion into a raster image may be implemented using the raster data conversion function of optional software or an application which has generated the electronic data to be registered.

Figure 4:
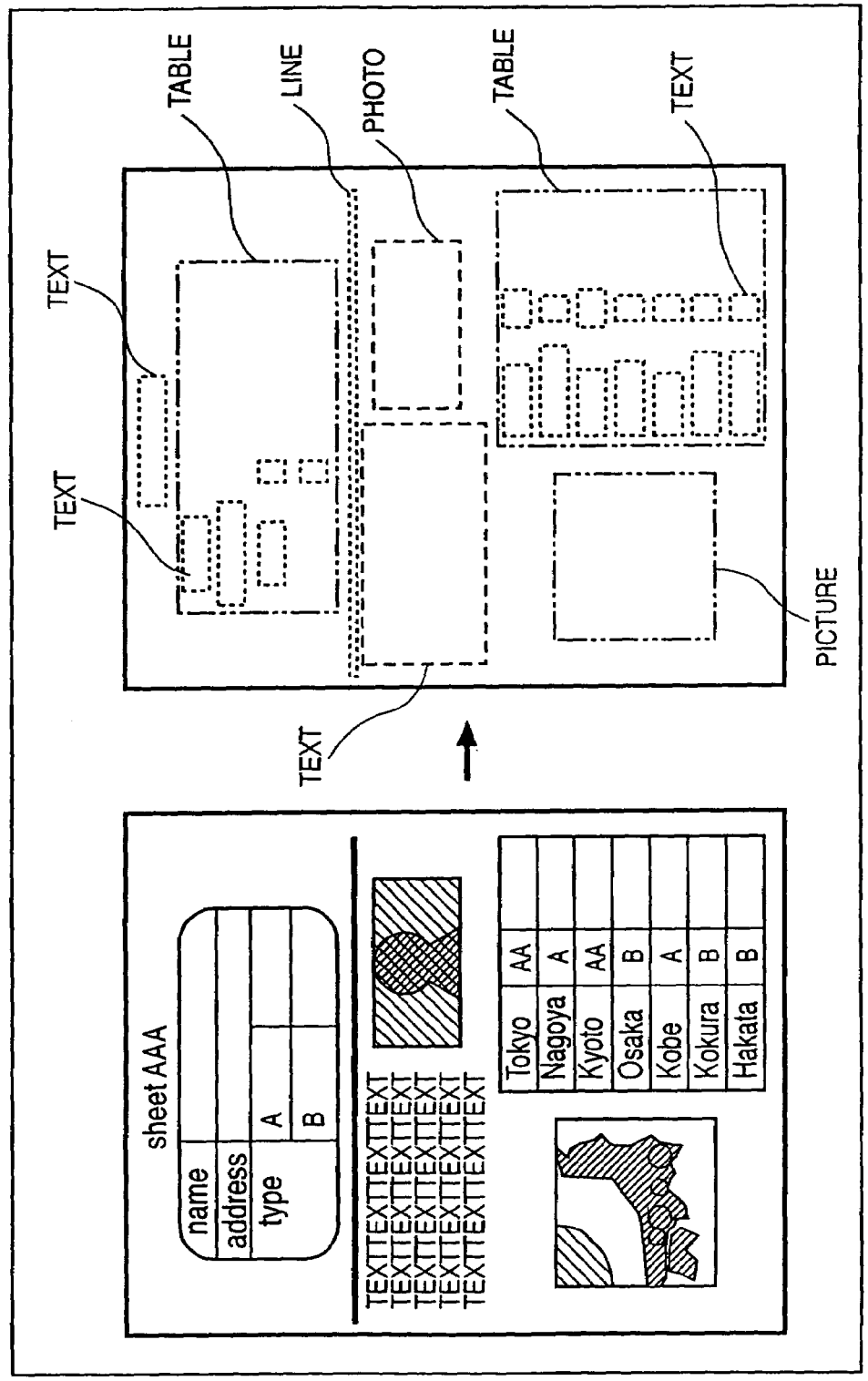
FIG. 4 is a view showing an example of partial region image extraction in the embodiment of the present invention.

A process by the region segmentation module 204 will be explained. In step S302, partial regions and their attributes are extracted from an image, and a region count N is obtained. As shown in FIG. 4, a partial region and its attribute are extracted by recognizing a document image on the left side as blocks of objects on the right side and determining the attribute of each block as a text, picture, photo, line, table, or the like.

An embodiment of this process will be described. An input image is binarized into a monochrome image, and edge tracking is performed to extract a cluster of pixels surrounded by a black pixel edge. In a cluster of black pixels in a large area, edge tracking is also performed for internal white pixels to extract a cluster of white pixels. Further, a cluster of black pixels is recursively extracted from the cluster of white pixels with a predetermined area or more.

Obtained clusters of black pixels are classified by size and shape into regions having different attributes. For example, a region having an aspect ratio of almost 1 and a size of a predetermined range is defined as a pixel cluster corresponding to a text. A part of adjacent characters which can be neatly grouped is defined as a text region. A plane pixel cluster is defined as a line region. A range of a black pixel cluster which neatly contains rectangular white pixel clusters with a predetermined size or more is defined as a table region. A region where indefinite pixel clusters scatter is defined as a photo region. A pixel cluster with another arbitrary shape is defined as a picture region.

In this case, a photo region of a rectangular shape where indefinite pixel clusters scatter is defined as an image region. Coordinates which express the region, and the attribute of the region representing whether the region is an image region or text region are output as extraction results.

Subsequently, processes by the region feature extraction module 205 and index update module 206 will be explained.

In step S303, a processed partial region counter I, text region counter J, and image region counter K are reset to 0. In step S304, if the count of the counter I is smaller than the partial region count N, the process advances to step S305; if NO, to step S314 after all partial regions have been processed. In step S314, the count of the text region counter J, that of the image region counter K, the IDs of image regions contained in a document image during the process, and the IDs of text regions contained in the document image during the process are stored in records corresponding to the document image during the process in the document image management DB shown in FIG. 7. After that, the process ends.

If I<N in step S304 (i.e., an unprocessed partial region is determined to exist), whether the partial region is an image region or text region is determined in step S305. If the partial region is a text region, the text region counter is incremented by one in step S306. In step S307, the barycentric position of the region, the size with respect to the document image, and the aspect ratio are obtained. The region undergoes an OCR process to extract intra-region text information as information representing the contents of the region. In step S308, a unique image region ID is issued in the image region index. In step S309, the image region ID, the barycentric position, the size with respect to the document image, the aspect ratio, and the intra-region text information are stored in the image region index in correspondence with each other. The process returns again to determination of an unprocessed partial region in step S304.

FIG. 8 shows the data schema of the text region management DB. The aspect ratio, the size, the barycentric position, the intra-region text information, and the ID of a document image containing an image region are stored in one record in association with an issued text region ID.

If the partial region is determined in step S305 not to be a text region, the image region counter is incremented by one in step S310. In step S311, the barycentric position of the region, the size with respect to the document image, the aspect ratio, and color feature information as information representing the contents of the region are extracted. In step S312, a unique image region ID is issued in the image region index. In step S313, the image region ID, the barycentric position, the size with respect to the document image, the aspect ratio, and the color feature information are stored in the image region index in correspondence with each other. In step S315, the region counter is incremented by one, and the process returns again to determination of an unprocessed partial region in step S304.

FIG. 9 shows the data schema of the text region management DB. The aspect ratio, the size, the barycentric position, the color feature information, and the ID of a document image containing an image region are stored in one record in association with an issued image region ID.

The barycentric position is defined as relative ($0 \leq X \leq 1$) position coordinates when the longitudinal and lateral sizes of a document image are 1. The document size is defined as an area when the area of the document image is 1. The aspect ratio is defined as the ratio of the number of longitudinal pixels to that of lateral pixels.

Figure 5:
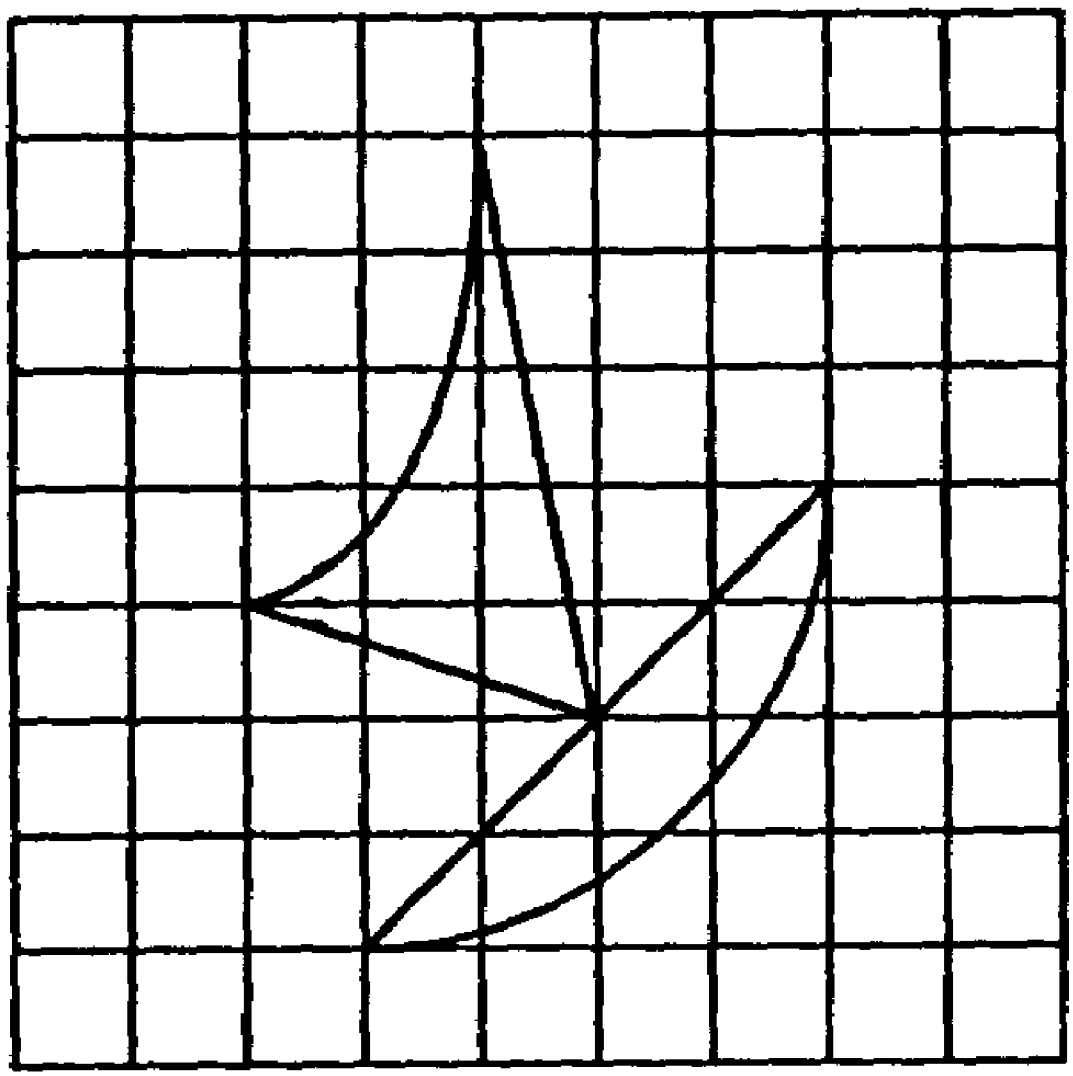
FIG. 5 is a view showing segmented blocks for image feature amount extraction in the embodiment of the present invention.
Figure 6:
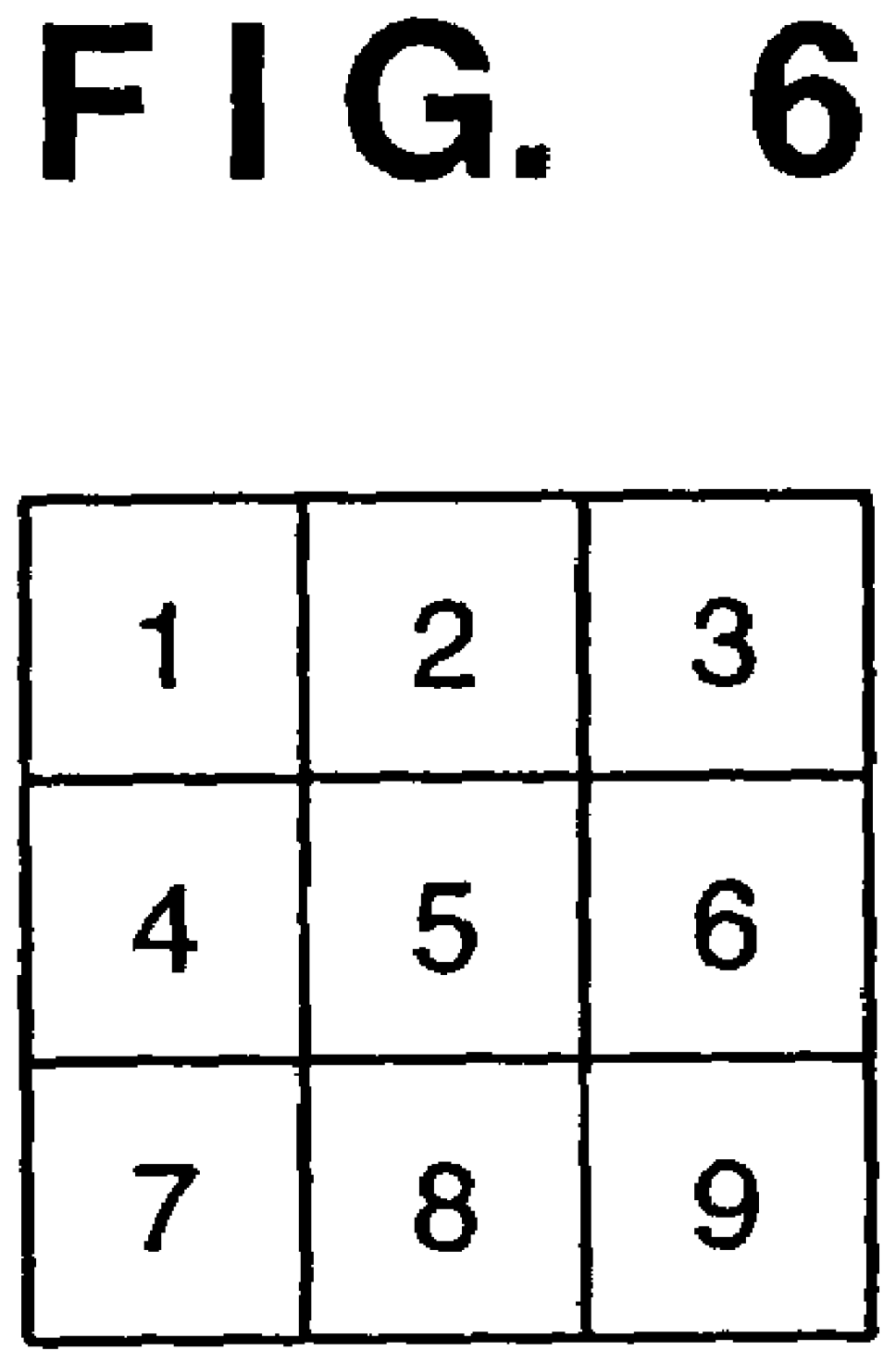

Color feature information is obtained by segmenting an image into blocks in longitudinal and lateral directions, as shown in the example of FIG. 5, calculating the average values of R, G, and B channels of pixels belonging to each block, and holding the blocks as a layout in a scanning order as shown in FIG. 6. FIG. 6 shows the scanning order of 3×3=9 blocks for illustrative convenience.

Intra-region text information is prepared by converting a text image within a region into text data by OCR. When the character type can be determined, it may also be stored.

[Search Process]

Image search processes are classified into two modes: exact match mode search and partial match mode search coping with a region detection error or excessive region detection which occurs upon segmenting a document image into a plurality of partial regions. Exact match mode search, partial match mode search, or hybrid search (to be described later) using a combination of exact match mode search and partial match mode search is selected via the user interface 201. The user interface preferably selects hybrid search having the advantages of the two, exact match mode search and partial match mode search in a default state, and if strict search is favored, selects exact match mode search.

The embodiment will describe a process when search is done upon designating a reference search document image which has not been registered in a DB.

<Exact Match Mode Search>

An exact match mode search process will be explained with reference to the processing flow of FIGS. 10A and 10B.

In step S1001, a reference search document image is obtained using the image input device 110 by execution of the reference search image input module 207. The reference search document image is temporarily stored in the image memory of the RAM 103 by the process of the temporary image storage module 208.

In step S1002, the region segmentation module 209 segments the reference search document image into pluralities of text regions and image regions. The region feature extraction module 210 extracts a total region count N, an image region count Jq, a text region count Kq, the barycentric positions, sizes, aspect ratios, and pieces of intra-region text information of text regions contained in the reference search document image, and the barycentric positions, sizes, aspect ratios, and pieces of color feature information of image regions. The pieces of extracted information are temporarily stored in the work area of the RAM 103.

The process in step S1002 is basically the same as the process in image registration shown in FIG. 3 except that the analysis results of the reference search document image are temporarily stored in the work area of the RAM 103 without registration in the DBs of FIGS. 7, 8, and 9. Thus, a detailed description of the process in step S1002 will be omitted.

A process by the region similarity comparison module 211 will be described.

In exact match search, it is very efficient to perform a pre-comparison process of obtaining registered document images each having image regions equal in number to image regions contained in a reference search document image and text regions equal in number to text regions contained in the reference search document image, and to calculate similarities for only image regions and text regions contained in the registered document images. In step S1003, therefore, document image IDs each having the image region count Jq and text region count Kq are obtained by referring to the image region count field and text region count field from the DB of FIG. 7.

In step S1004, the image region IDs of image regions contained in the document image IDs are ORed to generate target comparison image region IDs. Similarly, the text region IDs of text regions contained in the document image IDs are ORed to generate target comparison text region IDs.

In step S1005, the region counter I, text region counter J, and image region counter K are reset to 0. In step S1006, the region counter I and total region count are compared, and if an unprocessed region remains, the process branches to step S1007.

In step S1007, whether the Ith region is a text region or image region is determined. If the Ith region is a text region, the barycentric position of the Jth text region, the size with respect to the document image, the aspect ratio, and text information by OCR undergo similarity comparison with those of the target comparison text region IDs by referring to the DB of FIG. 8 in step S1008. Text region IDs having similarities equal to or higher than the threshold, and these similarities are temporarily stored.

Calculation of similarity between regions is common to that in partial match mode search, and will be described in detail later.

In step S1009, the text region IDs are converted into document image IDs by referring to the DB of FIG. 8, and the document image IDs and corresponding similarities are temporarily stored again.

In step S1010, the text region counter J is incremented by one.

If the Ith region is not a text region in step S1007, the Ith region is processed as an image region. In step S1011, the barycentric position of the Kth image region, the size with respect to the document image, the aspect ratio, and color feature information undergo similarity comparison with those of the target comparison image region IDs by referring to the DB of FIG. 9. Image region IDs having similarities equal to or higher than the threshold, and these similarities are temporarily stored.

Calculation of similarity between regions is common to that in partial match mode search, and will be described in detail later.

In step S1012, the image region IDs are converted into document image IDs by referring to the DB of FIG. 8, and the document image IDs and corresponding similarities are temporarily stored again.

In step S1013, the image region counter K is incremented by one.

In step S1016, the region counter I is incremented by one.

The above process provides pairs of document image IDs having image regions and text regions which are similar to partial regions of the reference search document image, and the similarities of the regions. In step S1006, the region counter I and total region count are compared, and if no unprocessed region exists, the process branches to step S1014.

The comprehensive search result determination module 212 executes a process in step S1014.

In step S1014, the document image IDs having image regions and text regions which are similar to partial regions of the reference search document image are ANDed, obtaining search result document image IDs having all image regions and text regions which are similar to partial regions of the reference search document image at a given similarity or more.

Similarities to the search result document image IDs are calculated by averaging similarities corresponding to these IDs while referring to similarities corresponding to document image IDs having image regions and text regions which are similar to partial regions of the reference search document image before ANDing. Average similarities are sorted as similarity comparison results in a descending order of similarities.

The process step S1015 by the search result display module 213 is finally done.

Figure 19:
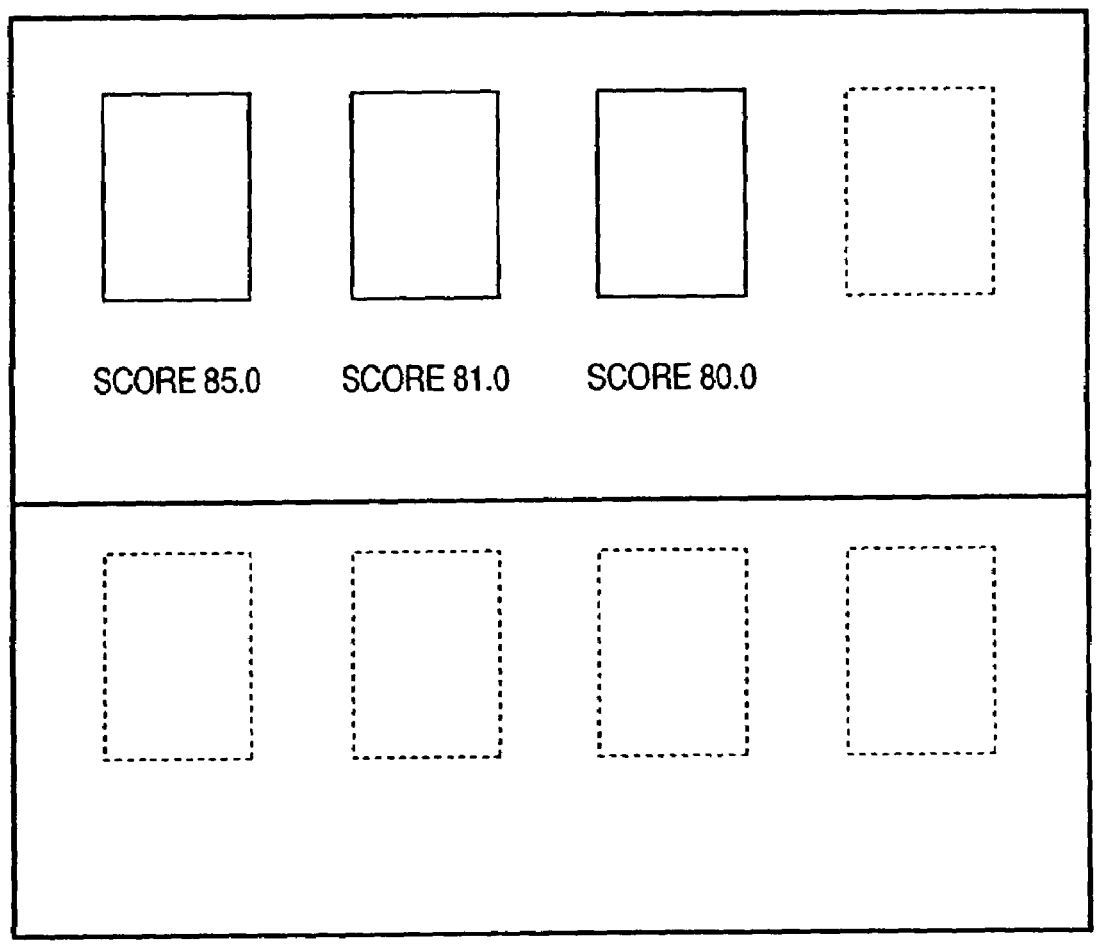
FIG. 19 is a view showing an example of a search result display window in the embodiment of the present invention.

In step S1015, as shown in FIG. 19, a search list is displayed using the thumbnail images of searched images, and the similarities of these images are also displayed.

Instead of searching for the fields in FIG. 7, the processes of steps S1003 and S1004 may adopt indices capable of easily searching for document image IDs and text region IDs on the basis of the text region count in FIG. 11, and indices capable of easily searching for document image IDs and image region IDs on the basis of the image region count in FIG. 12. The use of indices implements a higher-speed process.

<Partial Match Mode Search>

The feature of partial match mode search is "to obtain a partially matched, registered document image which contains similar regions at a predetermined ratio."

A partial match mode search process will be explained with reference to the processing flow of FIGS. 13A and 13B.

In step S1301, a reference search document image is obtained using the image input device 110 by execution of the reference search image input module 207. The reference search document image is temporarily stored in the image memory of the RAM 103 by the temporary image storage module 208. In step S1301, a containing ratio is obtained via the user interface 201. The containing ratio may be designated in advance by the user via the user interface or set in advance in a program.

The "containing ratio" is a ratio for "obtaining a partially matched, registered document image containing similar regions at a predetermined ratio."

For example, when a document image having only 10 image regions is set as a reference search document image and the containing ratio is 90%, the allowable range is 10% which permits one region. This corresponds to an allowable range of nine to 11 regions, and a document image containing the number of image regions within the allowable range is searched. When the number of images is small, the right of the decimal point may be rounded up. In place of the containing ratio, for example, an allowable number of 1 may be set from the beginning.

Processes by the region segmentation module 209 and region feature extraction module 210 will be described.

In step S1302, the reference search document image is segmented into text regions and image regions. The total region count N, the image region count Jq, the text region count Kq, the barycentric positions, sizes, aspect ratios, and pieces of intra-region text information of text regions contained in the reference search document image, and the barycentric positions, sizes, aspect ratios, and pieces of color feature information of image regions are extracted.

The process in step S1302 is basically the same as the process in image registration shown in FIG. 3 except that the analysis results of the reference search document image are temporarily stored in the memory without registration in the DBs of FIGS. 7, 8, and 9. Thus, a detailed description of the process in step S1302 will be omitted.

A process by the region similarity comparison module 211 will be described.

In partial match search, it is very efficient to perform a pre-comparison process of obtaining registered document images each having the number of image regions within a designated allowable range with reference to the number of image regions contained in a reference search document image, and the number of text regions within a designated allowable range with reference to the number of text regions contained in the reference search document image, and to calculate similarities for only image regions and text regions contained in the registered document images.

In step S1303, document image IDs each having the number of image regions within the allowable range of the image region count Jq contained in the reference search document image are obtained by referring to the image region count field and text region count field from the DB of FIG. 7. Similarly, document image IDs having the number of text regions within the allowable range of the text region count Kq contained in the reference search document image are obtained from the DB of FIG. 7. The obtained document image IDs are ANDed to obtain target comparison document image IDs. By considering the allowable range, any search omission can be prevented even when a region detection error or excessive region detection occurs in region segmentation.

In step S1304, the image region IDs of image regions contained in the document image IDs are ORed to generate target comparison image region IDs. Similarly, the text region IDs of text regions contained in the document image IDs are ORed to generate target comparison text region IDs.

In step S1305, the region counter I, text region counter J, and image region counter K are reset to 0.

In step S1306, the region counter I and total region count are compared, and if an unprocessed region remains, the process branches to step S1307.

In step S1307, whether the Ith region is a text region or image region is determined. If the Ith region is a text region, the barycentric position of the Jth text region, the size with respect to the document image, the aspect ratio, and text information by OCR undergo similarity comparison with those of the target comparison text region IDs by referring to the DB of FIG. 8 in step S1308. Text region IDs having similarities equal to or higher than the threshold, and these similarities are temporarily stored.

Calculation of similarity between regions is common to that in exact match mode search, and will be described in detail later.

In step S1309, the text region IDs are converted into document image IDs by referring to the DB of FIG. 8, and the document image IDs and corresponding similarities are temporarily stored again.

In step S1310, the text region counter J is incremented by one.

If the Ith region is not a text region in step S1307, the Ith region is processed as an image region. In step S1311, the barycentric position of the Kth image region, the size with respect to the document image, the aspect ratio, and color feature information undergo similarity comparison with those of the target comparison image region IDs by referring to the DB of FIG. 9. Image region IDs having similarities equal to or higher than the threshold, and these similarities are temporarily stored.

Calculation of similarity between regions is common to that in exact match mode search, and will be described in detail later.

In step S1312, the image region IDs are converted into document image IDs by referring to the DB of FIG. 8, and the document image IDs and corresponding similarities are temporarily stored again.

In step S1313, the image region counter K is incremented by one.

In step S1316, the region counter I is incremented by one.

The above process provides pairs of document image IDs having image regions and text regions which are similar to partial regions of the reference search document image, and the similarities of the regions.

In step S1306, the region counter I and total region count are compared, and if no unprocessed region exists, the process branches to step S1314.

In step S1314, a process by the comprehensive search result determination module 212 is performed.

In step S1314, document image IDs obtained by ORing document image IDs corresponding to regions are defined as the IDs of target document images used to calculate a comprehensive similarity in order to implement partial match search.

For a document image ID of interest, similarities to the image regions and text regions of a reference search document image are accumulated, and divided by the total region count of the reference search document image to calculate an average similarity. However, similarities to the image regions and text regions of the reference search document image are not always obtained because of partial match.

A region whose corresponding similarity has not been calculated is complemented by a default similarity at which the region may or may not be similar.

By using the obtained average similarity, document image IDs are sorted as similarity comparison results in a descending order of average similarities.

The process step S1315 by the search result display module 213 is finally done.

In step S1315, as shown in FIG. 19, a search list is displayed using the thumbnail images of searched images, and the similarities of these images are also displayed.

Similar to exact match search, instead of searching for the fields in FIG. 7, the processes of steps S1303 and S1304 may adopt indices capable of easily searching for document image IDs and text region IDs on the basis of the text region count in FIG. 11, and indices capable of easily searching for document image IDs and image region IDs on the basis of the image region count in FIG. 12. The use of indices implements a higher-speed process.

[Description of Region Similarity Comparison Process]

A method of obtaining the similarity of an image region in step S1011 of the processing flow of FIG. 10B in exact match mode search and step S1311 of the processing flow of FIG. 13B in partial match mode search, and a method of obtaining the similarity of a text region in step S1008 of the processing flow of FIG. 10B in exact match mode search and step S1308 of the processing flow of FIG. 13B in partial match mode search will be described in detail.

As described above, partial regions are classified into at least image regions and text regions. For an image region, an image feature amount associated with color or the like is used as a feature associated with the contents of the region. For a text region, text data information obtained by OCR, character type, character color, or the like is used. A comparison process is done for only regions of the same attribute.

<Image Region Comparison>

Figure 14:
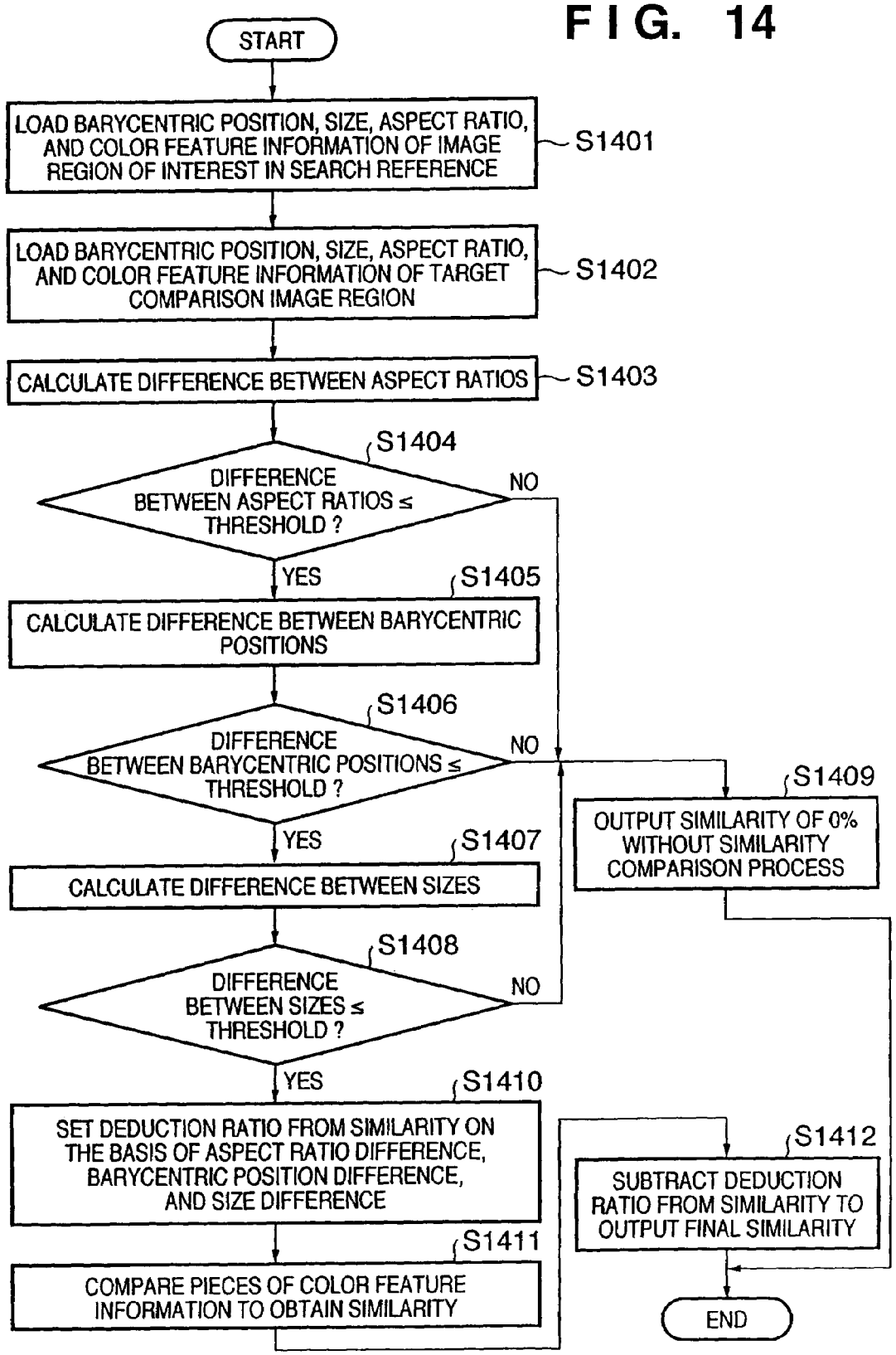
FIG. 14 is a flowchart showing an image region comparison process in the embodiment of the present invention.

A similarity comparison process between an image region of interest in a reference search document image and a target comparison image region will be explained with reference to the processing flow of FIG. 14.

In step S1401, the barycentric position, size, aspect ratio, and color feature information of an image region of interest in a search reference are loaded. In step S1402, the barycentric position, size, aspect ratio, and color feature information of a target comparison image region are loaded.

In step S1403, the difference between the aspect ratios is calculated. In step S1404, whether the difference between the aspect ratios is equal to or smaller than the threshold is determined. If the difference is equal to or smaller than the threshold, the process branches to step S1405; if the difference is larger than the threshold, to step S1409 to output a similarity of 0% without any similarity comparison process.

In step S1405, the difference between the barycentric positions is calculated. In step S1406, whether the difference between the barycentric positions is equal to or smaller than the threshold is determined. If the difference is equal to or smaller than the threshold, the process branches to step S1407; if the difference is larger than the threshold, to step S1409 to output a similarity of 0% without any similarity comparison process.

In step S1407, the difference between the sizes with respect to the documents is calculated. In step S1408, whether the difference between the sizes is equal to or smaller than the threshold is determined. If the difference is equal to or smaller than the threshold, the process branches to step S1410; if the difference is larger than the threshold, to step S1409 to output a similarity of 0% without any similarity comparison process.

In step S1410, a deduction ratio Rp from a similarity to be calculated later is set on the basis of the aspect ratio difference, barycentric position difference, and size difference.

Note that the arrangement may be configured to compare image regions for each document image ID, and a document image having no image region whose outer feature amount is similar to one image region of an input image may be excluded from target comparison document images so as not to be searched.

Let Asp0 be the aspect ratio of an image region of interest in the reference search document image, (Gx0,Gy0) be the barycentric position, and S0 be the size.

Also let Asp1 be the aspect ratio of the target comparison image region, (Gx1,Gy1) be the barycentric position, and S1 be the size.

In the above description of the registration process, the barycentric position is defined as relative ($0 \leq X \leq 1$) position coordinates when the longitudinal and lateral sizes of a document image are 1. The document size is defined as an area when the area of the document image is 1. The aspect ratio is defined as the ratio of the number of longitudinal pixels to that of lateral pixels.

Letting D_ASP, D_G, and D_S be the variances of the aspect ratio difference, barycentric position difference, and size difference which are recognized as correct values by using a data set experimentally recognized as correct data, and $\alpha1$, $\alpha2$, and $\alpha3$ be contribution factors given to the similarities of the aspect ratio difference, barycentric position difference, and size difference, the deduction ratio Rp is given by $$Rp = \alpha1 * abs(Asp1 - Asp0)/\text{D\_ASP} + \alpha2 * sqrt((Gx1 - Gx0) * \quad (1)$$
$$(Gx1 - Gx0) + (Gy1 - Gy0) * (Gy1 - Gy0))/\text{D\_G} +$$
$$\alpha2 * abs(S1 - S0)/\text{D\_S}$$

In step S1411, pieces of color feature information are compared to obtain a similarity.

Color feature information is obtained by segmenting an image into blocks equal in number in longitudinal and lateral directions in the example of FIG. 5, calculating the average values of R, G, and B channels of pixels belonging to each block, and holding the blocks as a layout in a scanning order as shown in FIG. 6. FIG. 6 shows the scanning order of 3×3=9 blocks for illustrative convenience.

In comparison, the color feature amount of a corresponding segmented block out of rearranged feature amounts is processed as follows.

Letting (R0,G0,B0) be the color average value of a block of interest in the reference search image region, (R1,G1,B1) be the color average value of a block of interest in the target comparison image region, and d be the similarity distance between the blocks of interest, d is given by $$d=\text{sqrt}((R0-R1)*(R0-R1)+(G0-G1)*(G0-G1)+(B0-B1)*(B0-B1)) \quad (2)$$

The similarity distance d is calculated for all corresponding blocks to calculate a cumulative distance Dsum.

Figure 15:
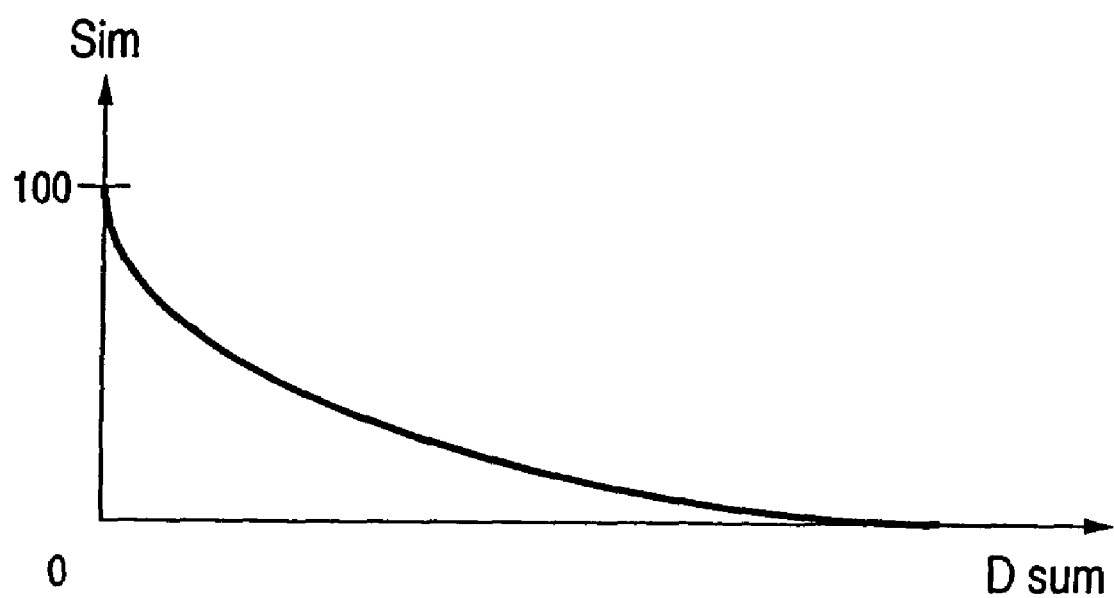
FIG. 15 is a graph showing an example of the characteristic of a function of converting a similarity distance used in the image region comparison process into a similarity in the embodiment of the present invention.

A similarity Sim can be attained from a cumulative distance ⇔similarity table in which the similarity is 100 for Dsum of 0 with a nonlinear characteristic, as shown in the graph of FIG. 15.

In step S1412, a comparison similarity Sim_Total of the image region is calculated using the deduction ratio obtained in step S1410:

$$\text{Sim\_Total}=\text{Sim}*(1-Rp) \quad (3)$$

<Text Region Comparison>

When a partial region of interest in a reference search document image is a text region, this partial region is compared with only partial text regions. At this time, text data obtained by OCR, the aspect ratio, the size with respect to a document image, and the barycentric position are employed.

Figure 16:
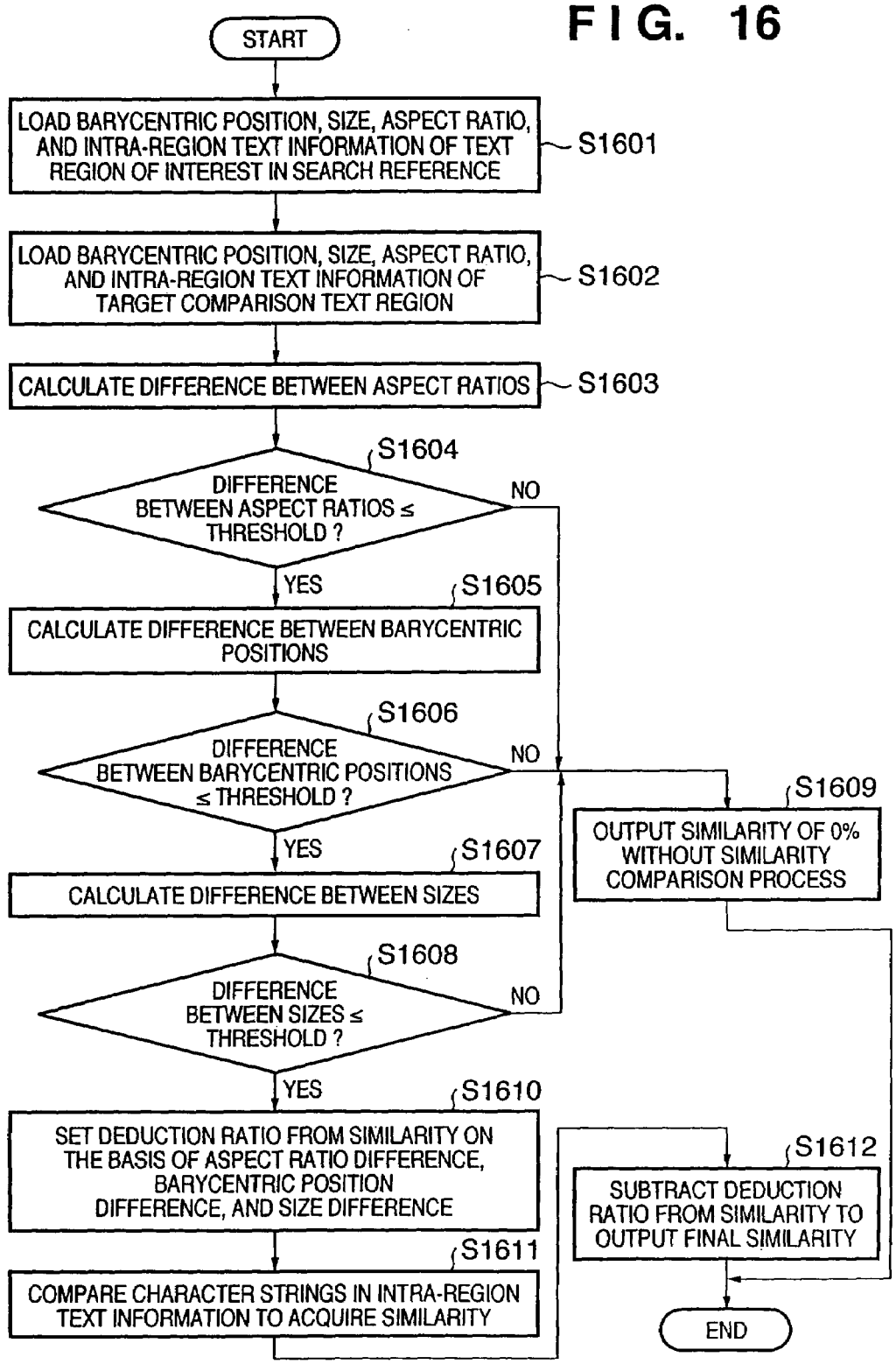
FIG. 16 is a flowchart showing a text region comparison process in the embodiment of the present invention.

A similarity comparison process between a text region of interest in a reference search document image and a target comparison text region will be explained with reference to the processing flow of FIG. 16.

In step S1601, the barycentric position, size, aspect ratio, and intra-region text information of an image region of interest in a search reference are loaded. In step S1602, the barycentric position, size, aspect ratio, and intra-region text information of a target comparison text region are loaded.

In step S1603, the difference between the aspect ratios is calculated. In step S1604, whether the difference between the aspect ratios is equal to or smaller than the threshold is determined. If the difference is equal to or smaller than the threshold, the process branches to step S1605; if the difference is larger than the threshold, to step S1609 to output a similarity of 0% without any similarity comparison process.

In step S1605, the difference between the barycentric positions is calculated. In step S1606, whether the difference between the barycentric positions is equal to or smaller than the threshold is determined. If the difference is equal to or smaller than the threshold, the process branches to step S1607; if the difference is larger than the threshold, to step S1609 to output a similarity of 0% without any similarity comparison process. In step S1607, the difference between the sizes with respect to the documents is calculated. In step S1608, whether the difference between the sizes is equal to or smaller than the threshold is determined. If the difference is equal to or smaller than the threshold, the process branches to step S1610; if the difference is larger than the threshold, to step S1609 to output a similarity of 0% without any similarity comparison process.

In step S1610, the deduction ratio Rp from a similarity to be calculated later is set on the basis of the aspect ratio difference, barycentric position difference, and size difference.

Note that the arrangement may be configured to compare text regions for each document image ID, and a document image having no text region whose outer feature amount is similar to one text region of an input image may be excluded from target comparison document images so as not to be searched.

Let Asp0 be the aspect ratio of a text region of interest in the reference search document image, (Gx0,Gy0) be the barycentric position, and S0 be the size. Also let Asp1 be the aspect ratio of the target comparison text region, (Gx1,Gy1) be the barycentric position, and S1 be the size.

In the above description of the registration process, the barycentric position is defined as relative ($0 \leq X \leq 1$) position coordinates when the longitudinal and lateral sizes of a document image are 1. The document size is defined as an area when the area of the document image is 1. The aspect ratio is defined as the ratio of the number of longitudinal pixels to that of lateral pixels.

Letting D_ASP, D_G, and D_S be the variances of the aspect ratio difference, barycentric position difference, and size difference which are recognized as correct values by using a data set experimentally recognized as correct data, and $\alpha1$, $\alpha2$, and $\alpha3$ be contribution factors given to the similarities of the aspect ratio difference, barycentric position difference, and size difference, Rp is given by $$Rp = \alpha1 * abs(Asp1 - Asp0)/D\_ASP + \alpha2 * sqrt((Gx1 - Gx0) * \quad (4)$$
$$(Gx1 - Gx0) + (Gy1 - Gy0)*(Gy1 - Gy0))/D\_G +$$
$$\alpha2 * abs(S1 - S0)/D\_S$$

In step S1611, pieces of intra-region text information are compared to obtain a similarity.

Figure 17:
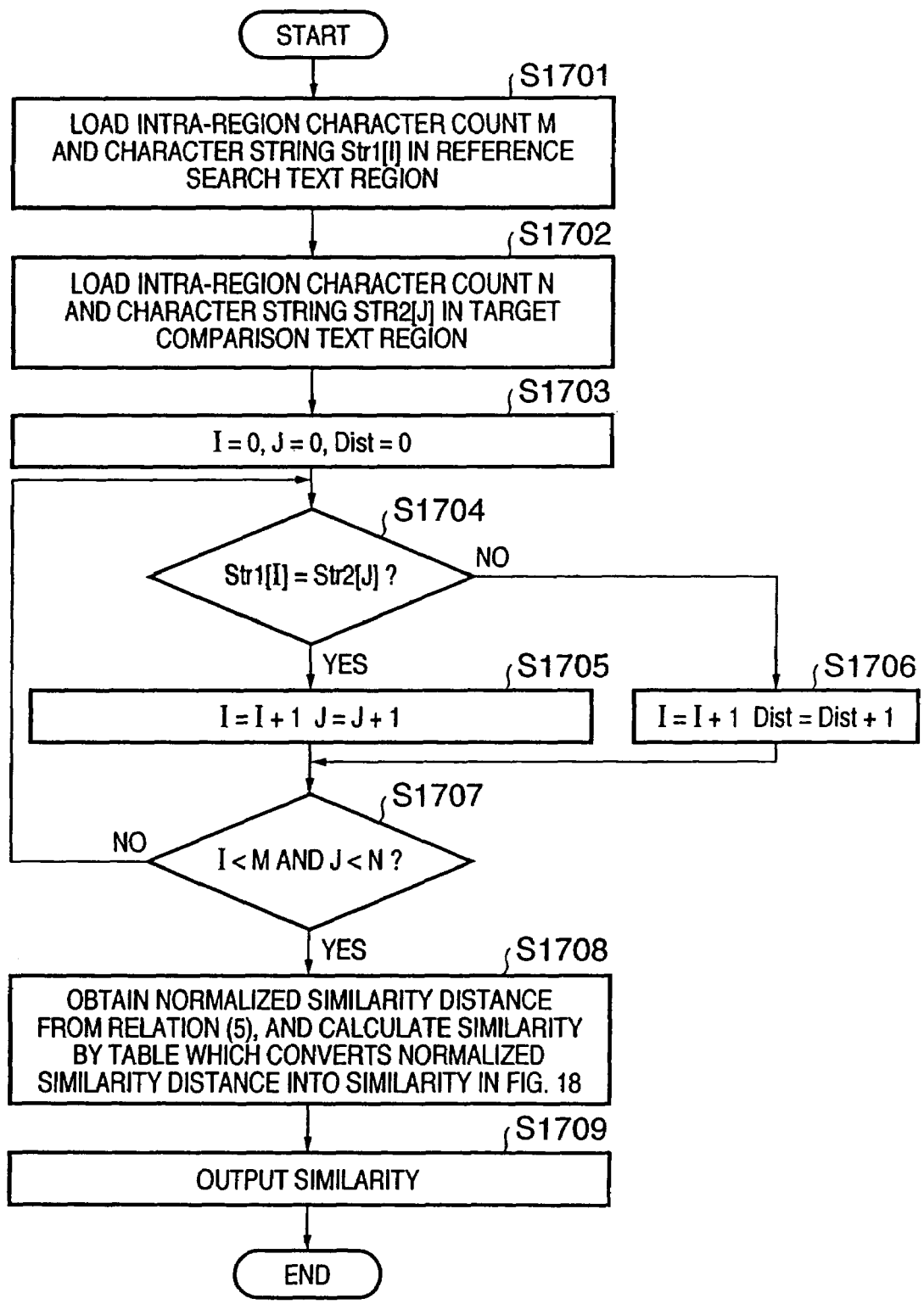
FIG. 17 is a flowchart showing a character string comparison process in the embodiment of the present invention.

A processing flow of obtaining a similarity will be explained with reference to FIG. 17.

In step S1701, an intra-region character count M and character string Str1[M] in a reference search text region are obtained.

In step S1702, an intra-region character count N and character string Str2[N] in a target comparison text region are obtained.

In step S1703, a string element number I for referring to Str1[M], a string element number J for referring to Str2[N], and a similarity distance Dist are reset to 0. Note that the origin of the string element number is 0.

That is, Str1[0] is set as the start character of the reference search text region.

In step S1704, the Ith reference search character Str1[I] and Jth target comparison character Str2[J] are compared. If Str1[I] and Str2[J] coincide with each other, I and J are incremented by one in step S1705 to advance the reference search character and comparison target character by one. Thereafter, the process shifts to step S1707.

If Str1[I] and Str2[J] do not coincide with each other in step S1704, only I is incremented by one in step S1706, i.e., only the reference search character is advanced by one, the similarity distance Dist is incremented by one, and the process shifts to step S1707.

In step S1707, whether I<M and J<N (i.e., whether reference characters fall within a limited range) is checked. If these conditions are satisfied, the process returns to step S1704 again to compare characters.

If NO in step S1707, a normalized similarity distance is calculated by $$\text{if } (M \leq N) \{ \quad (5)$$
$$Dnorm = (Dist + N - M)/N;$$
$$\text{else}$$
$$Dnorm = (Dist + M - N)/M$$

From relation (5), if the reference search character string and target comparison character string coincide with each other, Dnorm=0. The Dnorm value increases for a larger number of characters of the target comparison character string that do not exist in the reference comparison character string. When the lengths of the reference search character string and target comparison character string are different, the Dnorm value increases for a longer uncompared character length.

Figure 18:
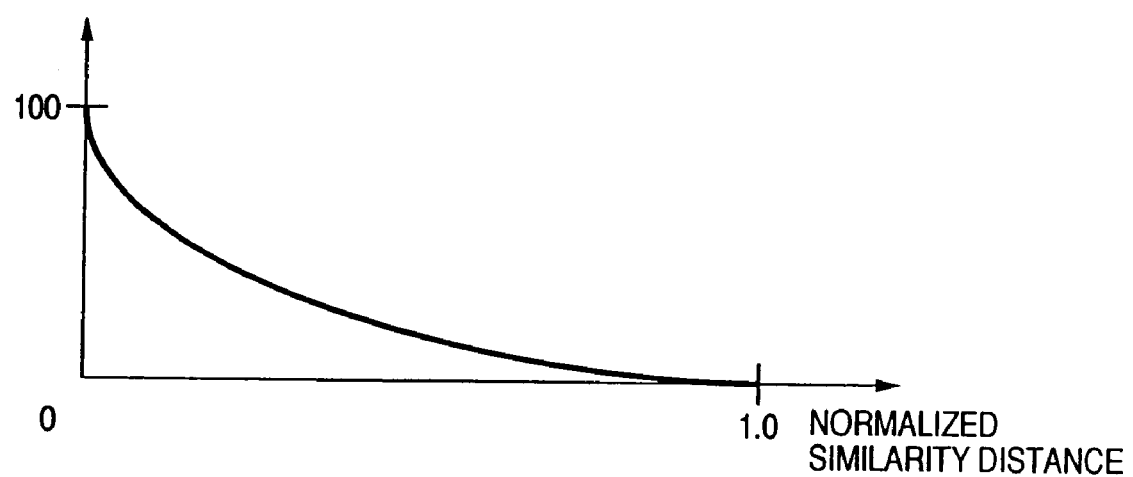
FIG. 18 is a graph showing an example of the characteristic of a function of converting a similarity distance obtained in the character string comparison process used in the text region comparison process into a similarity in the embodiment of the present invention.

The normalized similarity distance Dnorm is calculated, and a similarity Sim is attained by looking up a table which converts the normalized similarity distance Dnorm having a nonlinear characteristic as shown in FIG. 18 into a similarity.

In step S1612, a comparison similarity Sim_Total of the text region is calculated using the deduction ratio obtained in step S1610:

$$Sim\_Total=Sim*(1-Rp) \quad (6)$$

[Robust Process by Combination of Exact Match Mode Search and Partial Match Mode Search]

Figure 20:
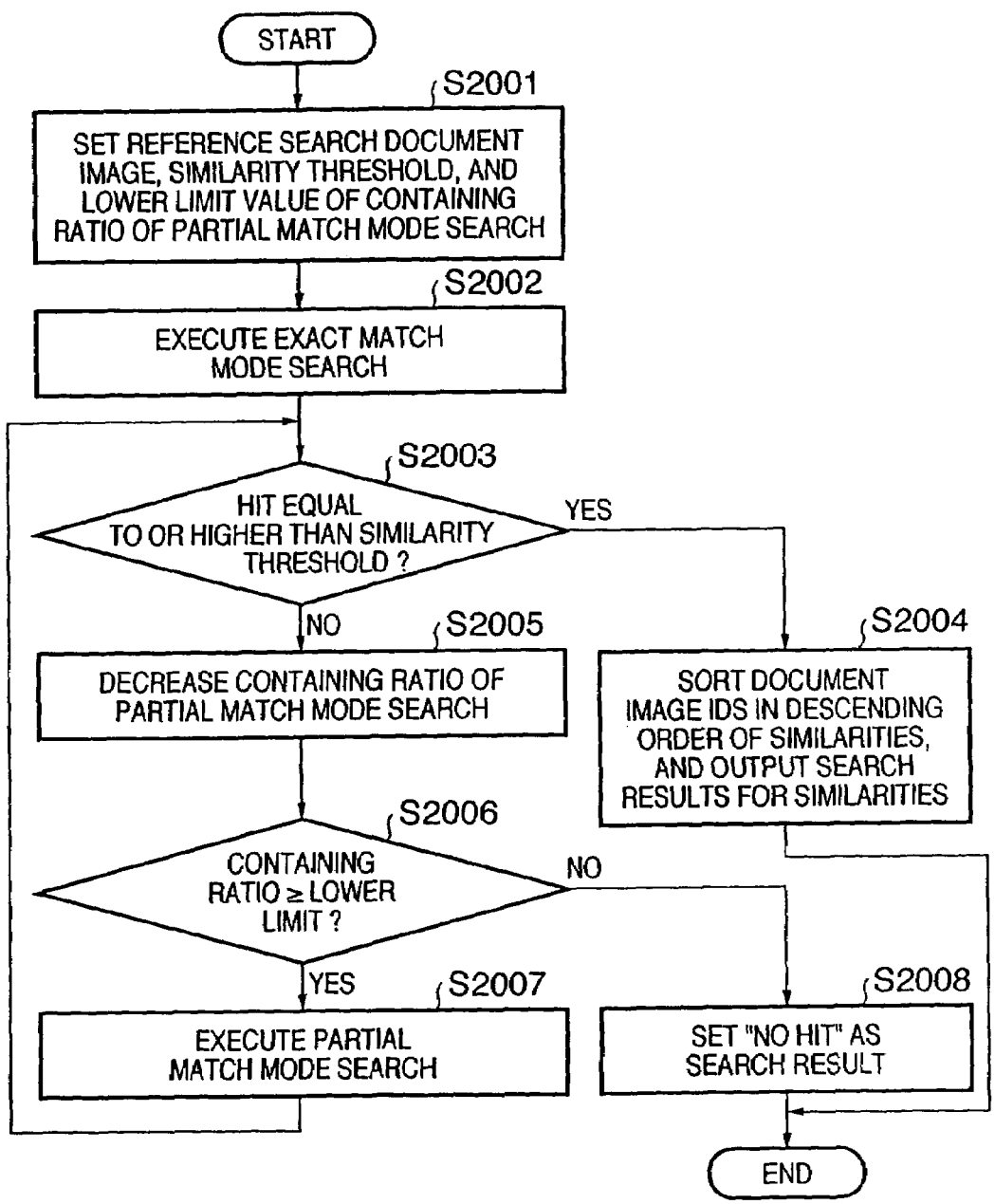
FIG. 20 is a flowchart showing a robust process using a combination of exact match mode search and partial match mode search in the embodiment of the present invention.

As described above, there are two conceivable modes as image search processes. One is exact match mode search, and the other is partial match mode search coping with a region detection error or excessive region detection which occurs upon segmenting a document image into a plurality of partial regions. Alternatively, a process is done in exact match mode search, and when no corresponding image is obtained, partial match mode search is done at a designated "containing ratio." Further, when no corresponding image is obtained, the "containing ratio" of partial match is decreased to raise the limitation, and a process is done in partial match mode search. A process is recursively executed in partial match mode search until the designated "containing ratio" reaches its lower limit. This can reduce search omission while maintaining the search precision. This process will be explained with reference to the flowchart of FIG. 20.

In S2001, a reference search document image, a similarity threshold, and the limit value of the allowable range of partial match mode search are set. In S2002, exact match mode search in FIG. 10A is executed except for search result list display step S1015 with the strictest search condition.

In S2003, the search result in S2002 and the similarity threshold are compared to check whether the search result equal to or higher than the similarity threshold has been obtained. If YES in S2003, document image IDs are sorted in a descending order of similarities, and search results corresponding to similarities are output in S2004.

If the search result equal to or higher than the similarity threshold is determined in S2003 not to be obtained, the "containing ratio" of partial match mode search is decreased in S2005. The "containing ratio" may be initially set by an exceptional process when the process first branches to S2005.

In S2006, whether the containing ratio is equal to or higher than the lower limit is determined. If YES in S2006, partial match mode search in FIG. 13A is executed in S2007 except for search result list display step S1315.

Referring back to S2003, the partial match mode search result and the similarity threshold are compared to check whether the search result equal to or higher than the similarity threshold has been obtained. If YES in S2003, document image IDs are sorted in a descending order of similarities, and search results corresponding to similarities are output in S2004.

If no search result equal to or higher than the similarity threshold is obtained, the flow returns to the process of S2005 to perform a recursive process until a hit equal to or higher than the similarity threshold is detected in S2003 or the "containing ratio" becomes lower than the lower limit value in S2006. If the containing ratio becomes lower than the limit value in S2006, "no hit" is set as the search result in S2008, and the process ends.

Note that the above-mentioned combination method and exact match mode search may be selected. If strict search is preferable, exact match mode search can be selected. Partial match mode search may also be displayed as a choice, but may not always be provided as a choice because the combination method is an optimal use of partial match mode search.

The embodiment has exemplified only classification of regions into text and image regions, but the present invention is not limited to this. Regions may be classified into texts, pictures, photos, lines, tables, and the like, and search targets may be narrowed down on the basis of the number of regions of each attribute.

Other Embodiment

In the above embodiment, a reference search image is supplied as a search query. A registered image can also be supplied as a search query.

Figure 10A:
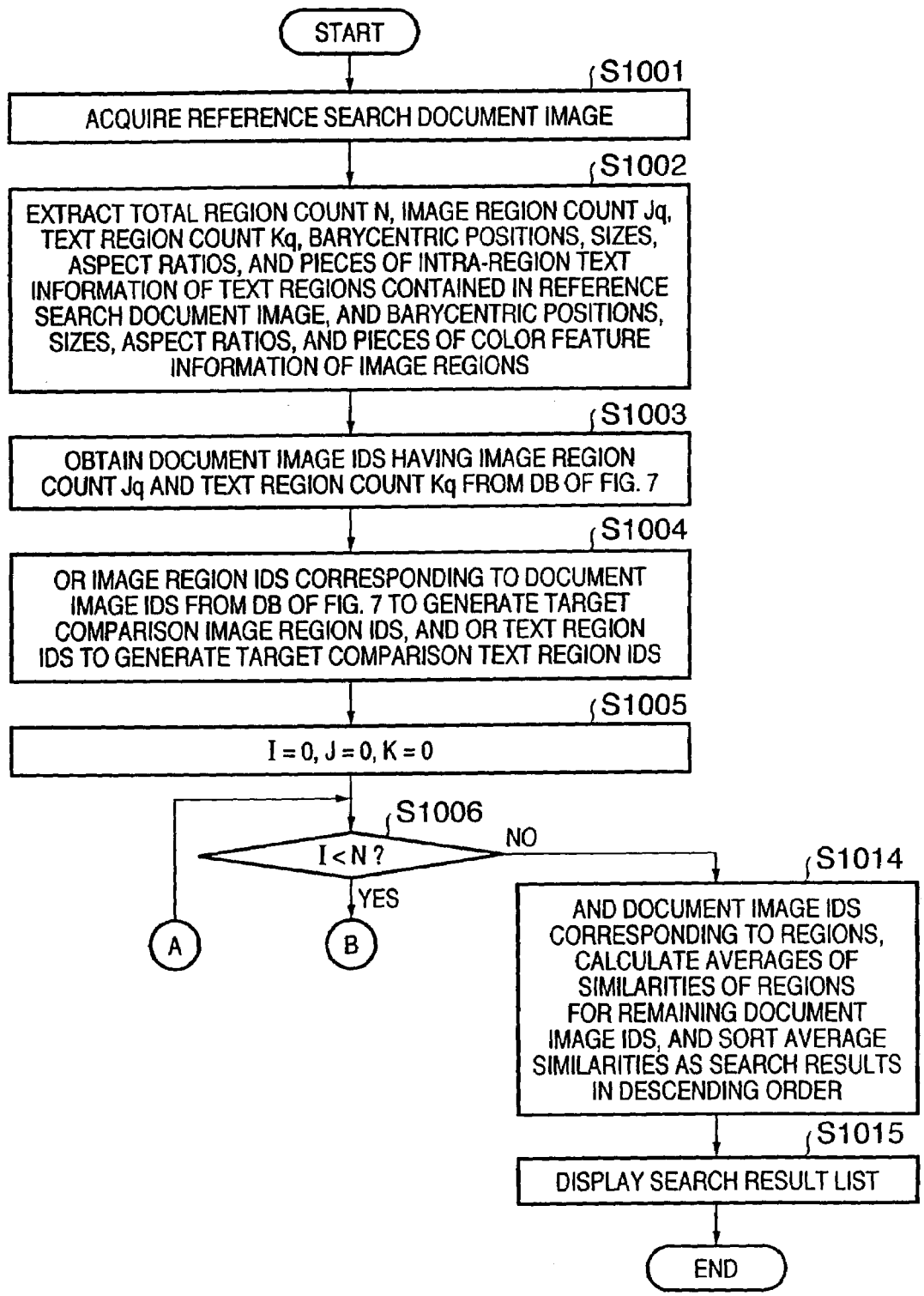
FIGS. 10A and 10B are processing flowcharts showing exact match mode search in the embodiment of the present invention.
Figure 10B:
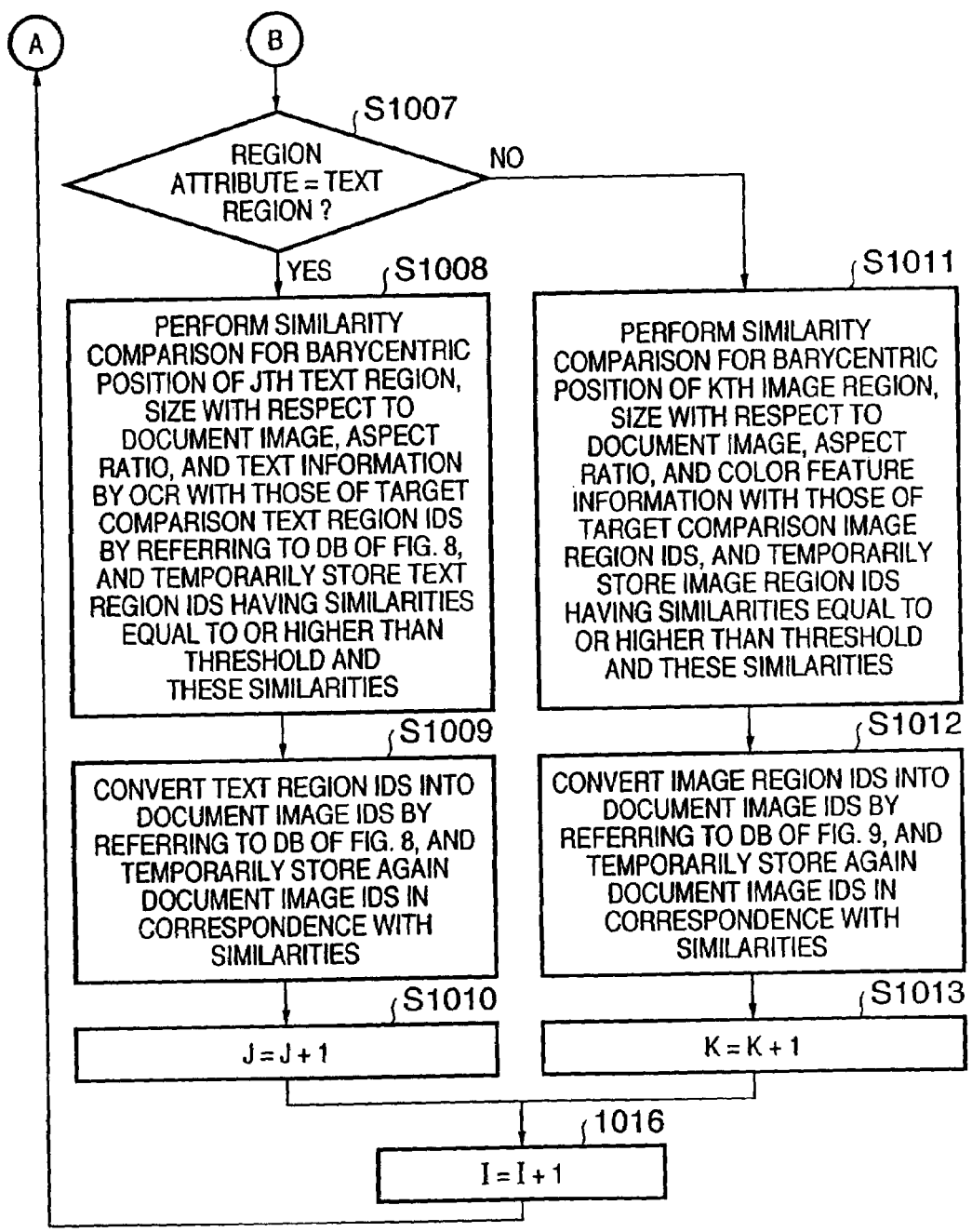

In this case, only steps S1001 and S1002 in FIG. 10A in the exact match mode search process are replaced by a process of reading out, from a DB, the total region count N, image region count Jq, text region count Kq of a registered reference search image, the barycentric positions, sizes, aspect ratios, and pieces of intra-region text information of text regions contained in the reference search document image, and the barycentric positions, sizes, aspect ratios, and pieces of color feature information of image regions.

Figure 13A:
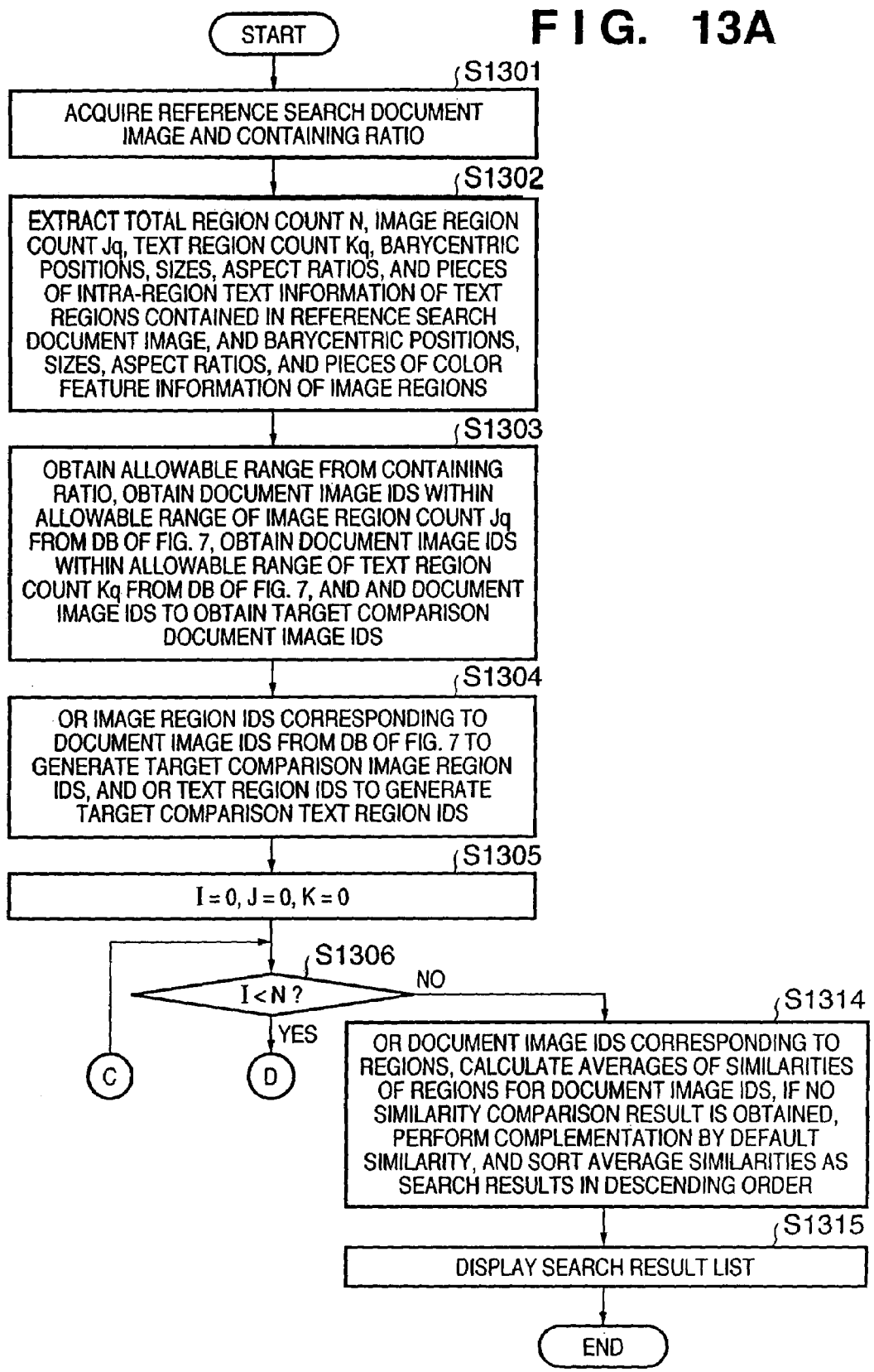
FIGS. 13A and 13B are processing flowcharts showing partial match mode search in the embodiment of the present invention.
Figure 13B:
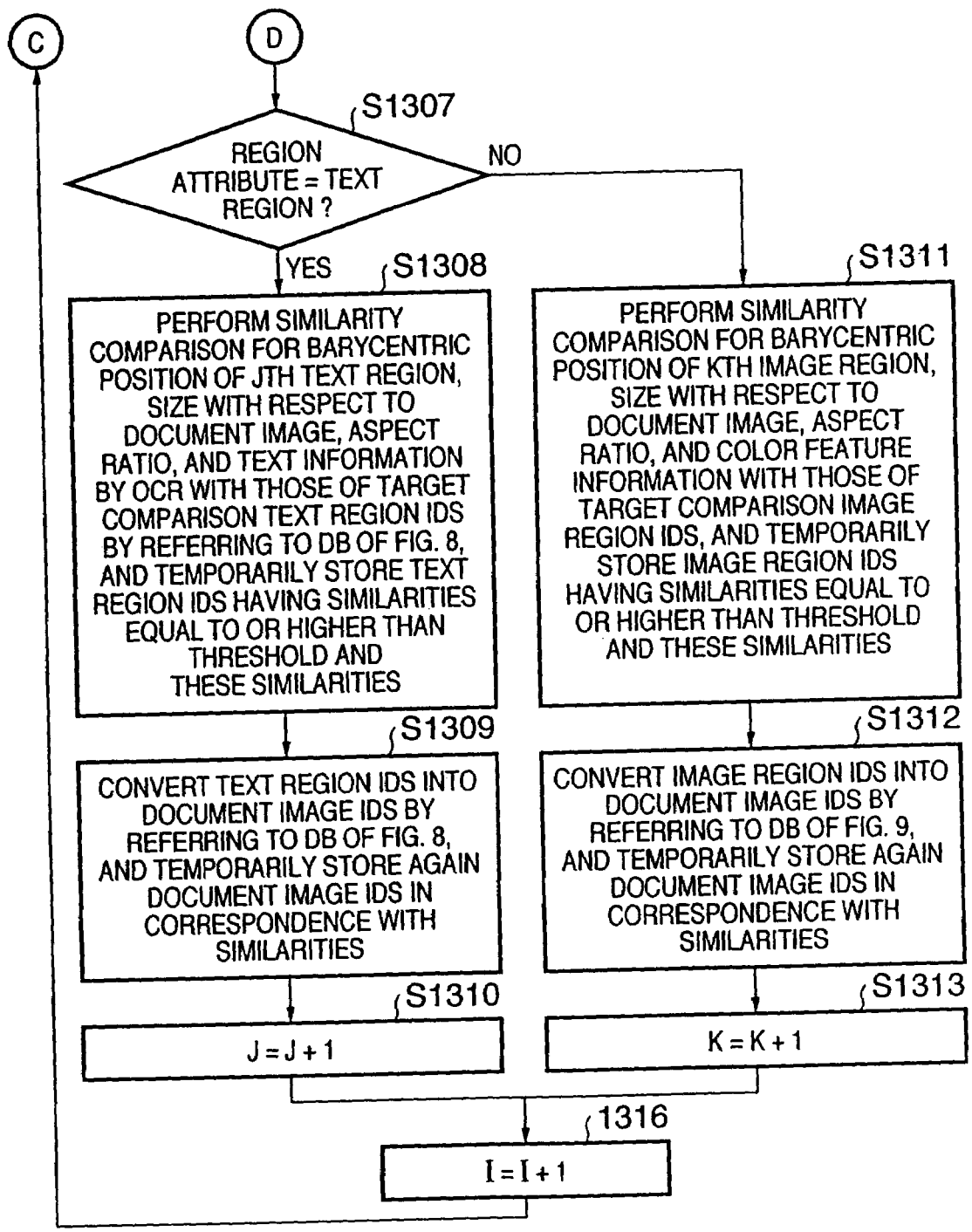

Also in the partial match mode search process, only steps S1301 and S1302 in FIG. 13A are replaced by a process of designating the allowable range of partial match search, and reading out, from a DB, the total region count N, image region count Jq, text region count Kq of a registered reference search image, the barycentric positions, sizes, aspect ratios, and pieces of intra-region text information of text regions contained in the reference search document image, and the barycentric positions, sizes, aspect ratios, and pieces of color feature information of image regions.

In partial match search, search is executed by designating a ratio at which search results should contain corresponding regions. The "containing ratios" for image and text regions may have the same value or different values. For example, when the region detection precision of a text region is higher than that of an image region, the "containing ratio" for the text region is set higher than that for the image region.

In the embodiment, similarities calculated for partial regions are averaged as a comprehensive similarity in step S1001 of FIG. 10A in the exact match mode search process and step S1301 of FIG. 13A in the partial match mode search process. Alternatively, a similarity average or weighted average can be calculated.

To implement this, the user is prompted to designate, as search conditions in advance, weights $\gamma$ and $\beta$ which put importance on a text region and image region. The similarities are multiplied by a text region normalization weight $WT=\gamma/(\gamma+\beta)$ and an image region normalization weight $WI=\beta/(\gamma+\beta)$ to calculate averages. Accordingly, weighted averages can be attained.

A comprehensive similarity FinalSim can be expressed using a text region count M, a similarity STi of the ith text region, Wi, an image region count N, and a similarity SIj of the jth text region:

$$FinalSim = \left\{\sum_{i=0}^{M} WT*STi + \sum_{j=0}^{N} Wi*SIj\right\} / \{M*WT + N*Wi\} \quad (7)$$

The difference between the color feature comparison precision in an image region and the intra-region text information comparison precision in a text region particularly depends on the number of characters within the text region. When the text data amount in the text region is small, the information amount is small. In this case, optimal weighting can be automatically achieved by decreasing the weight of the similarity of the text region.

To realize this, for example, an empirical character count threshold $\zeta$ at which the same similarity precision as that of an image region is employed. A weight Wi for a character count n in the ith text region is given by if $(n \geq \zeta)$, $Wi=1.0$;

else, $Wi=1.0-n/\zeta;$ \quad (8)

The comprehensive similarity FinalSim can be expressed using the text region count M, the similarity STi of the ith text region, Wi, the image region count N, and the similarity SIj of the jth text region:

$$FinalSim = \left\{ \sum_{i=0}^{M} Wi * STi + \sum_{j=0}^{N} SIj \right\} / \left\{ \sum_{i=0}^{M} Wi + N \right\} \quad (9)$$

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A document processing apparatus having a database which stores a plurality of document images, comprising:
   first segmentation means for segmenting a document image associated with registration into partial regions;
   first attribute determination means for determining an attribute of each partial region of the segmented document image associated with registration;
   registration means for registering the document image associated with registration and the attribute of the partial region of the document image associated with registration in a database in correspondence with each other;
   second segmentation means for segmenting a document image associated with search into partial regions;
   second attribute determination means for determining an attribute of each partial region of the segmented document image associated with search; and
   selection means for selecting at least one document image from document images registered in the database on the basis of the number of partial regions for each attribute in the document image associated with search,
   wherein said first and second attribute determination means determine that the partial regions are at least text regions or image regions,
   and said selection means selects from the database a document image containing text regions equal in number to text regions of the document image associated with search and containing image regions equal in number to image regions of the document image associated with search.

2. A document processing apparatus having a database which stores a plurality of document images, comprising:
   first segmentation means for segmenting a document image associated with registration into partial regions;
   first attribute determination means for determining an attribute of each partial region of the segmented document image associated with registration;
   registration means for registering the document image associated with registration and the attribute of the partial region of the document image associated with registration in a database in correspondence with each other;
   second segmentation means for segmenting a document image associated with search into partial regions;
   second attribute determination means for determining an attribute of each partial region of the segmented document image associated with search; and
   selection means for selecting at least one document image from document images registered in the database on the basis of the number of partial regions for each attribute in the document image associated with search,
   wherein said first and second attribute determination means determine that the partial regions are at least text regions or image regions,
   and said selection means selects from the database a document image containing the number of text regions considering an allowable number with respect to the number of text regions of the document image associated with search and containing the number of image regions considering an allowable number with respect to the number of image regions of the document image associated with search.

3. A document processing apparatus having a database which stores a plurality of document images, comprising:
first segmentation means for segmenting a document image associated with registration into partial regions;
first attribute determination means for determining an attribute of each partial region of the segmented document image associated with registration;
registration means for registering the document image associated with registration and the attribute of the partial region of the document image associated with registration in a database in correspondence with each other;
second segmentation means for segmenting a document image associated with search into partial regions;
second attribute determination means for determining an attribute of each partial region of the segmented document image associated with search;
selection means for selecting at least one document image from document images registered in the database on the basis of the number of partial regions for each attribute in the document image associated with search;
means for extracting a predetermined feature amount from each partial region of the document image associated with registration and registering the feature amount in the database in correspondence with the document image associated with registration;
means for extracting a feature amount from each partial region of the document image associated with search; and
means for calculating a similarity of the feature amount of the partial region of the document image associated with search to a partial region of a document image registered in the database,
wherein said first and second attribute determination means determine that the partial regions are at least text regions or image regions,
and said selection means selects from the database a document image containing text regions which are equal in number to text regions of the document image associated with search and have similarities higher than a first threshold and containing image regions which are equal in number to image regions of the document image associated with search and have similarities higher than a second threshold.

4. A document processing apparatus having a database which stores a plurality of document images, comprising:
first segmentation means for segmenting a document image associated with registration into partial regions;
first attribute determination means for determining an attribute of each partial region of the segmented document image associated with registration;
registration means for registering the document image associated with registration and the attribute of the partial region of the document image associated with registration in a database in correspondence with each other;
second segmentation means for segmenting a document image associated with search into partial regions;
second attribute determination means for determining an attribute of each partial region of the segmented document image associated with search;
selection means for selecting at least one document image from document images registered in the database on the basis of the number of partial regions for each attribute in the document image associated with search;
means for extracting a feature amount depending on an attribute from each partial region of the document image associated with registration and registering the feature amount in the database in correspondence with the document image associated with registration;
means for extracting a feature amount depending on an attribute from each partial region of the document image associated with search; and
means for calculating a similarity of the feature amount of the partial region of the document image associated with search to a partial region of a document image registered in the database,
wherein said first and second attribute determination means determine that the partial regions are at least text regions or image regions,
and said selection means selects from the database a document image containing the number of text regions which consider an allowable number with respect to text regions of the document image associated with search and have similarities higher than a first threshold, and containing the number of image regions which consider an allowable number with respect to image regions of the document image associated with search and have similarities higher than a second threshold.

5. The apparatus according to claim 3, wherein the predetermined feature amount includes a first feature amount associated with an outer shape of the partial region and a second feature amount associated with a content of the partial region,
and said means for calculating the similarity of the feature amount includes
means for calculating a similarity of the first feature amount of a partial region of interest in the document image associated with search with respect to a partial region of interest in a document image registered in the database, and
means for, when the calculated first feature amount exceeds a third threshold, calculating a similarity of the second feature amount of the partial region of interest in the document image associated with search with respect to the partial region of interest in the document image registered in the database.

6. A document processing apparatus having a database which stores a plurality of document images, comprising:
first segmentation means for segmenting a document image associated with registration into partial regions;
first attribute determination means for determining an attribute of each partial region of the segmented document image associated with registration;
registration means for registering the document image associated with registration and the attribute of the partial region of the document image associated with registration in a database in correspondence with each other;
second segmentation means for segmenting a document image associated with search into partial regions;
second attribute determination means for determining an attribute of each partial region of the segmented document image associated with search;
selection means for selecting at least one document image from document images registered in the database on the basis of the number of partial regions for each attribute in the document image associated with search; and search means for searching the document image selected by said selection means for an image similar to the document image associated with search, wherein said first and second attribute determination means determine that the partial regions are at least text regions or image regions, said selection means selects from the database a document image containing text regions equal in number to text regions of the document image associated with search and containing image regions equal in number to image regions of the image associated with search, when no corresponding region is searched as a result of applying said search means, said selection means selects from the database a document image containing the number of text regions considering an allowable number with respect to the number of text regions of the document image associated with search and containing the number of image regions considering an allowable number with respect to the number of image regions of the document image associated with search, when no corresponding region is searched from the selected document image as a result of applying said search means, said selection means increments the allowable number, and selects from the database a document image containing the number of text regions considering the allowable number with respect to the number of text regions of the document image associated with search and containing the number of image regions considering the allowable number with respect to the number of image regions of the document image associated with search, and said selection means increments the allowable number and recursively performs a process until a corresponding region is searched from the selected document image as a result of applying said search means and the allowable number reaches a predetermined number.

7. A method for a document processing apparatus having a database which stores a plurality of document images, the method comprising:

a first segmentation step for segmenting a document image associated with registration into partial regions;

a first attribute determination step for determining an attribute of each partial region of the segmented document image associated with registration;

a registration step for registering the document image associated with registration and the attribute of the partial region of the document image associated with registration in a database in correspondence with each other;

a second segmentation step for segmenting a document image associated with search into partial regions;

a second attribute determination step for determining an attribute of each partial region of the segmented document image associated with search; and a selection step for selecting at least one document image from document images registered in the database on the basis of the number of partial regions for each attribute in the document image associated with search, wherein said first and second attribute determination steps determine that the partial regions are at least text regions or image regions, and said selection step selects from the database a document image containing text regions equal in number to text regions of the document image associated with search and containing image regions equal in number to image regions of the document image associated with search.

8. A method for a document processing apparatus having a database which stores a plurality of document images, the method comprising:

a first segmentation step for segmenting a document image associated with registration into partial regions;

a first attribute determination step for determining an attribute of each partial region of the segmented document image associated with registration;

a registration step for registering the document image associated with registration and the attribute of the partial region of the document image associated with registration in a database in correspondence with each other;

a second segmentation step for segmenting a document image associated with search into partial regions;

a second attribute determination step for determining an attribute of each partial region of the segmented document image associated with search; and a selection step for selecting at least one document image from document images registered in the database on the basis of the number of partial regions for each attribute in the document image associated with search, wherein said first and second attribute determination steps determine that the partial regions are at least text regions or image regions, and said selection step selects from the database a document image containing the number of text regions considering an allowable number with respect to the number of text regions of the document image associated with search and containing the number of image regions considering an allowable number with respect to the number of image regions of the document image associated with search.

9. A method for a document processing apparatus having a database which stores a plurality of document images, the method comprising:

a first segmentation step for segmenting a document image associated with registration into partial regions;

a first attribute determination step for determining an attribute of each partial region of the segmented document image associated with registration;

a registration step for registering the document image associated with registration and the attribute of the partial region of the document image associated with registration in a database in correspondence with each other;

a second segmentation step for segmenting a document image associated with search into partial regions;

a second attribute determination step for determining an attribute of each partial region of the segmented document image associated with search;

a selection step for selecting at least one document image from document images registered in the database on the basis of the number of partial regions for each attribute in the document image associated with search;

a first extraction step for extracting a predetermined feature amount from each partial region of the document image associated with registration and registering the feature amount in the database in correspondence with the document image associated with registration;

a second extraction step for extracting a feature amount from each partial region of the document image associated with search; and a calculation step for calculating a similarity of the feature amount of the partial region of the document image associated with search to a partial region of a document image registered in the database, wherein said first and second attribute determination steps determine that the partial regions are at least text regions or image regions, and said selection step selects from the database a document image containing text regions which are equal in number to text regions of the document image associated with search and have similarities higher than a first threshold and containing image regions which are equal in number to image regions of the document image associated with search and have similarities higher than a second threshold.

10. A method for a document processing apparatus having a database which stores a plurality of document images, the method comprising:

a first segmentation step for segmenting a document image associated with registration into partial regions;

a first attribute determination step for determining an attribute of each partial region of the segmented document image associated with registration;

a registration step for registering the document image associated with registration and the attribute of the partial region of the document image associated with registration in a database in correspondence with each other;

a second segmentation step for segmenting a document image associated with search into partial regions;

a second attribute determination step for determining an attribute of each partial region of the segmented document image associated with search;

a selection step for selecting at least one document image from document images registered in the database on the basis of the number of partial regions for each attribute in the document image associated with search;

a first extraction step for extracting a feature amount depending on an attribute from each partial region of the document image associated with registration and registering the feature amount in the database in correspondence with the document image associated with registration;

a second extraction step for extracting a feature amount depending on an attribute from each partial region of the document image associated with search; and a calculation step for calculating a similarity of the feature amount of the partial region of the document image associated with search to a partial region of a document image registered in the database, wherein said first and second attribute determination steps determine that the partial regions are at least text regions or image regions, and said selection step selects from the database a document image containing the number of text regions which consider an allowable number with respect to text regions of the document image associated with search and have similarities higher than a first threshold, and containing the number of image regions which consider an allowable number with respect to image regions of the document image associated with search and have similarities higher than a second threshold.

11. The method according to claim 9, wherein the predetermined feature amount includes a first feature amount associated with an outer shape of the partial region and a second feature amount associated with a content of the partial region, and said calculation step includes a first similarity calculation step for calculating a similarity of the first feature amount of a partial region of interest in the document image associated with search with respect to a partial region of interest in a document image registered in the database, and a second similarity calculation step for, when the calculated first feature amount exceeds a third threshold, calculating a similarity of the second feature amount of the partial region of interest in the document image associated with search with respect to the partial region of interest in the document image registered in the database.

12. A method for a document processing apparatus having a database which stores a plurality of document images, the method comprising:

a first segmentation step for segmenting a document image associated with registration into partial regions;

a first attribute determination step for determining an attribute of each partial region of the segmented document image associated with registration;

a registration step for registering the document image associated with registration and the attribute of the partial region of the document image associated with registration in a database in correspondence with each other;

a second segmentation step for segmenting a document image associated with search into partial regions;

a second attribute determination step for determining an attribute of each partial region of the segmented document image associated with search;

a selection step for selecting at least one document image from document images registered in the database on the basis of the number of partial regions for each attribute in the document image associated with search; and a search step for searching the document image selected in said selection step for an image similar to the document image associated with search, wherein said first and second attribute determination steps determine that the partial regions are at least text regions or image regions, said selection step selects from the database a document image containing text regions equal in number to text regions of the document image associated with search and containing image regions equal in number to image regions of the image associated with search, when no corresponding region is searched as a result of performing said search step, said selection step selects from the database a document image containing the number of text regions considering an allowable number with respect to the number of text regions of the document image associated with search and containing the number of image regions considering an allowable number with respect to the number of image regions of the document image associated with search, when no corresponding region is searched from the selected document image as a result of performing said search step, said selection step increments the allowable number, and selects from the database a document image containing the number of text regions considering the allowable number with respect to the number of text regions of the document image associated with search and containing the number of image regions considering the allowable number with respect to the number of image regions of the document image associated with search, and said selection step increments the allowable number and recursively performs a process until a corresponding region is searched from the selected document image as a result of performing said search step and the allowable number reaches a predetermined number.

13. A computer-readable storage medium storing a computer-executable program for a document processing apparatus having a database which stores a plurality of document images, the program comprising code for:
 a first segmentation step for segmenting a document image associated with registration into partial regions;
 a first attribute determination step for determining an attribute of each partial region of the segmented document image associated with registration;
 a registration step for registering the document image associated with registration and the attribute of the partial region of the document image associated with registration in a database in correspondence with each other;
 a second segmentation step for segmenting a document image associated with search into partial regions;
 a second attribute determination step for determining an attribute of each partial region of the segmented document image associated with search; and
 a selection step for selecting at least one document image from document images registered in the database on the basis of the number of partial regions for each attribute in the document image associated with search,
 wherein said first and second attribute determination steps determine that the partial regions are at least text regions or image regions,
 and said selection step selects from the database a document image containing text regions equal in number to text regions of the document image associated with search and containing image regions equal in number to image regions of the document image associated with search.

14. A computer-readable storage medium storing a computer-executable program for a document processing apparatus having a database which stores a plurality of document images, the program comprising code for:
 a first segmentation step for segmenting a document image associated with registration into partial regions;
 a first attribute determination step for determining an attribute of each partial region of the segmented document image associated with registration;
 a registration step for registering the document image associated with registration and the attribute of the partial region of the document image associated with registration in a database in correspondence with each other;
 a second segmentation step for segmenting a document image associated with search into partial regions;
 a second attribute determination step for determining an attribute of each partial region of the segmented document image associated with search; and
 a selection step for selecting at least one document image from document images registered in the database on the basis of the number of partial regions for each attribute in the document image associated with search,
 wherein said first and second attribute determination steps determine that the partial regions are at least text regions or image regions,
 and said selection step selects from the database a document image containing the number of text regions considering an allowable number with respect to the number of text regions of the document image associated with search and containing the number of image regions considering an allowable number with respect to the number of image regions of the document image associated with search.

15. A computer-readable storage medium storing a computer-executable program for a document processing apparatus having a database which stores a plurality of document images, the program comprising code for:
 a first segmentation step for segmenting a document image associated with registration into partial regions;
 a first attribute determination step for determining an attribute of each partial region of the segmented document image associated with registration;
 a registration step for registering the document image associated with registration and the attribute of the partial region of the document image associated with registration in a database in correspondence with each other;
 a second segmentation step for segmenting a document image associated with search into partial regions;
 a second attribute determination step for determining an attribute of each partial region of the segmented document image associated with search;
 a selection step for selecting at least one document image from document images registered in the database on the basis of the number of partial regions for each attribute in the document image associated with search;
 a first extraction step for extracting a predetermined feature amount from each partial region of the document image associated with registration and registering the feature amount in the database in correspondence with the document image associated with registration;
 a second extraction step for extracting a feature amount from each partial region of the document image associated with search; and
 a calculation step for calculating a similarity of the feature amount of the partial region of the document image associated with search to a partial region of a document image registered in the database,
 wherein said first and second attribute determination steps determine that the partial regions are at least text regions or image regions,
 and said selection step selects from the database a document image containing text regions which are equal in number to text regions of the document image associated with search and have similarities higher than a first threshold and containing image regions which are equal in number to image regions of the document image associated with search and have similarities higher than a second threshold.

16. A computer-readable storage medium storing a computer-executable program for a document processing apparatus having a database which stores a plurality of document images, the program comprising code for:
 a first segmentation step for segmenting a document image associated with registration into partial regions;
 a first attribute determination step for determining an attribute of each partial region of the segmented document image associated with registration;
 a registration step for registering the document image associated with registration and the attribute of the partial region of the document image associated with registration in a database in correspondence with each other;
 a second segmentation step for segmenting a document image associated with search into partial regions;

a second attribute determination step for determining an attribute of each partial region of the segmented document image associated with search;

a selection step for selecting at least one document image from document images registered in the database on the basis of the number of partial regions for each attribute in the document image associated with search;

a first extraction step for extracting a feature amount depending on an attribute from each partial region of the document image associated with registration and registering the feature amount in the database in correspondence with the document image associated with registration;

a second extraction step for extracting a feature amount depending on an attribute from each partial region of the document image associated with search; and a calculation step for calculating a similarity of the feature amount of the partial region of the document image associated with search to a partial region of a document image registered in the database, wherein said first and second attribute determination steps determine that the partial regions are at least text regions or image regions, and said selection step selects from the database a document image containing the number of text regions which consider an allowable number with respect to text regions of the document image associated with search and have similarities higher than a first threshold, and containing the number of image regions which consider an allowable number with respect to image regions of the document image associated with search and have similarities higher than a second threshold.

17. The computer-readable storage medium according to claim 15, wherein the predetermined feature amount includes a first feature amount associated with an outer shape of the partial region and a second feature amount associated with a content of the partial region, and said calculation step includes a first similarity calculation step for calculating a similarity of the first feature amount of a partial region of interest in the document image associated with search with respect to a partial region of interest in a document image registered in the database, and a second similarity calculation step for, when the calculated first feature amount exceeds a third threshold, calculating a similarity of the second feature amount of the partial region of interest in the document image associated with search with respect to the partial region of interest in the document image registered in the database.

18. A computer-readable storage medium storing a computer-executable program for a document processing apparatus having a database which stores a plurality of document images, the program comprising code for:

a first segmentation step for segmenting a document image associated with registration into partial regions;

a first attribute determination step for determining an attribute of each partial region of the segmented document image associated with registration;

a registration step for registering the document image associated with registration and the attribute of the partial region of the document image associated with registration in a database in correspondence with each other;

a second segmentation step for segmenting a document image associated with search into partial regions;

a second attribute determination step for determining an attribute of each partial region of the segmented document image associated with search;

a selection step for selecting at least one document image from document images registered in the database on the basis of the number of partial regions for each attribute in the document image associated with search; and a search step for searching the document image selected in said selection step for an image similar to the document image associated with search, wherein said first and second attribute determination steps determine that the partial regions are at least text regions or image regions, said selection step selects from the database a document image containing text regions equal in number to text regions of the document image associated with search and containing image regions equal in number to image regions of the image associated with search, when no corresponding region is searched as a result of performing said search step, said selection step selects from the database a document image containing the number of text regions considering an allowable number with respect to the number of text regions of the document image associated with search and containing the number of image regions considering an allowable number with respect to the number of image regions of the document image associated with search, when no corresponding region is searched from the selected document image as a result of performing said search step, said selection step increments the allowable number, and selects from the database a document image containing the number of text regions considering the allowable number with respect to the number of text regions of the document image associated with search and containing the number of image regions considering the allowable number with respect to the number of image regions of the document image associated with search, and said selection step increments the allowable number and recursively performs a process until a corresponding region is searched from the selected document image as a result of performing said search step and the allowable number reaches a predetermined number.

* * * * *